(12) United States Patent
Ishimaru

(10) Patent No.: US 6,935,985 B2
(45) Date of Patent: *Aug. 30, 2005

(54) GEAR CHANGE-SPEED UNIT FOR AUTOMATIC TRANSMISSION

(75) Inventor: Wataru Ishimaru, Kanagawa (JP)

(73) Assignee: Jatco LTD, Fuji (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/619,459

(22) Filed: Jul. 16, 2003

(65) Prior Publication Data
US 2004/0014554 A1 Jan. 22, 2004

(30) Foreign Application Priority Data
Jul. 16, 2002 (JP) ........................................ 2002-207242

(51) Int. Cl.[7] ................................................ F16H 3/44
(52) U.S. Cl. .................... 475/296; 475/275; 475/284; 475/311; 475/323
(58) Field of Search ................................. 475/269, 271, 475/275, 284, 296, 311, 313, 323, 325

(56) References Cited

U.S. PATENT DOCUMENTS

| 1,773,535 | A | * | 8/1930 | Lane ........................... 475/255 |
|---|---|---|---|---|
| 5,106,352 | A | | 4/1992 | Lepelletier |
| 6,752,737 | B2 | * | 6/2004 | Ishimaru et al. ............. 475/275 |
| 2004/0014549 | A1 | * | 1/2004 | Choi ........................... 475/269 |
| 2004/0014550 | A1 | * | 1/2004 | Tsuga .......................... 475/275 |
| 2004/0014551 | A1 | * | 1/2004 | Tsuga .......................... 475/275 |
| 2004/0077452 | A1 | * | 4/2004 | Ishimaru et al. ............. 475/271 |

FOREIGN PATENT DOCUMENTS

| JP | 4-219553 A | | 8/1992 | |
|---|---|---|---|---|
| JP | 2004052808 A | * | 2/2004 | ............. F16H/3/66 |

OTHER PUBLICATIONS

U.S. Appl. No. 10/619,724, filed Jul. 16, 2003, Ishimaru.
U.S. Appl. No. 10/614,827, filed Jul. 9, 2003, Tsuga.
U.S. Appl. No. 10/446,869, filed May 29, 2003, Tsuga.
U.S. Appl. No. 10/619,559, filed Jul. 16, 2003, Taguchi.
U.S. Appl. No. 10/617,788, filed Jul. 14, 2003, Choi.
U.S. Appl. No. 10/617,787, filed Jul. 14, 2003, Ikeda.

* cited by examiner

Primary Examiner—Tisha Lewis
(74) Attorney, Agent, or Firm—Foley & Lardner LLP

(57) ABSTRACT

A gear change-speed unit for an automatic transmission includes a reduction planetary-gear set, a single-pinion type planetary-gear set, and a double-sun-gear type planetary-gear set, which are disposed in parallel in this order from the side of an input shaft.

20 Claims, 14 Drawing Sheets

| GEAR RATIO | FRICTION ELEMENT | C1 | C2 | C3 | B1 | B2 | 5.5 | 6.0 | 6.5 | 7.0 |
|---|---|---|---|---|---|---|---|---|---|---|
| FORWARD | 1st | ○ | | | | ○ | 4.060 | 4.260 | 4.583 | 4.782 |
| | 2nd | ○ | | | ○ | | 2.192 | 2.360 | 2.500 | 2.773 |
| | 3rd | ○ | ○ | | | | 1.538 | 1.600 | 1.677 | 1.818 |
| | 4th | ○ | | ○ | | | 1.153 | 1.164 | 1.170 | 1.205 |
| | 5th | | ○ | ○ | | | 0.891 | 0.870 | 0.862 | 0.824 |
| | 6th | | | ○ | | ○ | 0.741 | 0.714 | 0.714 | 0.678 |
| REVERSE | | | ○ | | ○ | | 4.396 | 4.000 | 4.167 | 3.828 |
| | | | | | | $\alpha 1$ | 0.350 | 0.375 | 0.400 | 0.450 |
| | | | | | | $\alpha 2$ | 0.350 | 0.400 | 0.400 | 0.475 |
| | | | | | | $\alpha 3$ | 0.425 | 0.475 | 0.500 | 0.525 |

FIG.11

| | | 6 SPEEDS | | | | | |
|---|---|---|---|---|---|---|---|
| | | RATIO COVERAGE: 1 | | | RATIO COVERAGE: 2 | | |
| | | | ISHIMARU-TYPE | | | ISHIMARU-TYPE | |
| | | RAVIGNEAUX-TYPE | REDUCTION DOUBLE PINION | REDUCTION SINGLE PINION | RAVIGNEAUX-TYPE | REDUCTION DOUBLE PINION | REDUCTION SINGLE PINION |
| PLANETARY-GEAR RATIO | α1 | 0.575 | 0.350 | 0.550 | 0.650 | 0.425 | 0.625 |
| | α2 | 0.375 | 0.350 | 0.500 | 0.475 | 0.350 | 0.550 |
| | α3 | 0.350 | 0.500 | 0.375 | 0.350 | 0.500 | 0.350 |
| SPEED RATIO | 1st | 4.500 | 4.505 | 4.392 | 4.714 | 5.093 | 5.072 |
| | 2nd | 2.373 | 2.308 | 2.325 | 2.637 | 2.609 | 2.519 |
| | 3rd | 1.575 | 1.538 | 1.550 | 1.650 | 1.739 | 1.625 |
| | 4th | 1.146 | 1.136 | 1.148 | 1.160 | 1.170 | 1.141 |
| | 5th | 0.880 | 0.891 | 0.883 | 0.842 | 0.872 | 0.881 |
| | 6th | 0.727 | 0.741 | 0.727 | 0.678 | 0.741 | 0.741 |
| | REVERSE | 4.200 | 4.395 | 4.133 | 3.474 | 4.969 | 4.634 |
| SPEED-TO-SPEED RATIO | 1st/2nd | 1.896 | 1.952 | 1.889 | 1.788 | 1.952 | 2.013 |
| | 2nd/3rd | 1.507 | 1.501 | 1.500 | 1.598 | 1.500 | 1.550 |
| | 3rd/4th | 1.374 | 1.354 | 1.356 | 1.422 | 1.488 | 1.424 |
| | 4th/5th | 1.302 | 1.275 | 1.294 | 1.378 | 1.342 | 1.295 |
| | 5th/6th | 1.210 | 1.202 | 1.215 | 1.242 | 1.177 | 1.189 |
| FORWARD/REVERSE RATIO | REVERSE/1st | 0.933 | 0.976 | 0.941 | 0.737 | 0.976 | 0.914 |
| TRANSFER EFFICIENCY | 1st | 0.968 | 0.969 | 0.974 | 0.968 | 0.989 | 0.974 |
| | 2nd | 0.950 | 0.968 | 0.972 | 0.952 | 0.968 | 0.972 |
| | 3rd | 0.993 | 0.988 | 0.993 | 0.993 | 0.988 | 0.993 |
| | 4th | 0.982 | 0.987 | 0.989 | 0.983 | 0.988 | 0.989 |
| | 5th | 0.989 | 0.988 | 0.989 | 0.989 | 0.989 | 0.990 |
| | 6th | 0.993 | 0.993 | 0.993 | 0.993 | 0.993 | 0.993 |
| | 7th | | | | | | |
| | REVERSE | 0.978 | 0.973 | 0.978 | 0.978 | 0.973 | 0.978 |
| ENGAGEMENT-ELEMENT TORQUE SHARE | C1 | 1.575 | 1.203 | 1.550 | 1.650 | 1.175 | 1.625 |
| | C2 | 1.575 | 1.538 | 1.550 | 1.650 | 1.739 | 1.625 |
| | C3 | 1.209 | 1.538 | 1.214 | 1.243 | 1.739 | 1.190 |
| | B1 | 5.775 | 0.769 | 5.683 | 5.124 | 0.909 | 6.268 |
| | B2 | 0.798 | 5.934 | 0.775 | 0.987 | 6.708 | 0.894 |
| | TOTAL | 10.932 | 10.982 | 10.772 | 10.654 | 12.270 | 11.602 |
| NUMBER OF INCREASED ENGAGEMENT ELEMENTS WHEN ADOPTING OWC | OWC1 | 0 | 0 | 0 | 0 | 0 | 0 |
| | OWC2 | 1 | 1 | 1 | 1 | 1 | 1 |
| | OWC3 | 2 | 2 | 2 | 2 | 2 | 2 |
| RATIO COVERAGE | MINIMUM | 4.81 | 5.08 | 4.81 | 4.81 | 5.08 | 4.81 |
| | MAXIMUM | 7.20 | 9.02 | 7.80 | 7.20 | 9.02 | 7.80 |
| DIRECT COUPLING MODE | | UNAVAILABLE | UNAVAILABLE | UNAVAILABLE | UNAVAILABLE | UNAVAILABLE | UNAVAILABLE |
| 7th GEAR RATIO | | AVAILABLE | AVAILABLE | AVAILABLE | AVAILABLE | AVAILABLE | AVAILABLE |

GEAR CHANGE-SPEED UNIT FOR AUTOMATIC TRANSMISSION

BACKGROUND OF THE INVENTION

The present invention relates to a gear change-speed unit for an automatic transmission, comprising an input part, three planetary-gear sets, three clutches, two brakes, and an output part wherein engaging/releasing as appropriate the three clutches and two brakes serving as change-speed elements achieves at least 6 forward speeds and 1 reverse speed.

JP-A 4-219553 (=FR2656055) shows a gear change-speed unit for an automatic transmission, comprising an input shaft, a single-pinion type planetary-gear set, a Simpson-type planetary-gear train including a combination of two single-pinion type planetary-gear sets, three clutches, two brakes, and an output shaft wherein engaging/releasing as appropriate the three clutches and two brakes serving as change-speed elements achieves 6 forward speeds and 1 reverse speed.

SUMMARY OF THE INVENTION

The gear change-speed unit comprising single-pinion type planetary-gear set and Simpson-type planetary-gear train as disclosed in the reference has the following advantages:

I) Favorable unit strength, since in the Simpson-type planetary-gear train, torque-transfer flow at first speed where torque becomes maximum is shared among all members; and II) Favorable gear strength and life, carrier rigidity, and the like, since the Simpson-type planetary-gear train adopts ring-gear input, which allows a 50 percent reduction in tangential force with respect to sun-gear input.

On the other hand, the above gear change-speed unit presents the following problems:

III) Necessity of carrier input to the Simpson-type planetary-gear train so as to achieve overdrive (O/D) speed. If input and output shafts are arranged coaxially, an input path to the carrier cannot be established in the single-pinion type planetary-gear set having merely three rotary members; and IV) Occurrence of necessity of arrangement of the input and output shafts on different parallel axes so as to establish an input path to the carrier. This results in an increase in radial dimension of the transmission.

In order to solve the problems III) and IV), the reference proposes a gear change-speed unit comprising a Ravigneaux-type compound planetary-gear train in place of Simpson-type planetary-gear train.

The gear change-speed unit comprising Ravigneaux-type compound planetary-gear train allows coaxial arrangement of all components to avoid arrangement on different parallel axes, but presents the following problems:

V) Unfavorable mechanical strength, since maximum torque of the gear train (at first speed) is applied to one double-pinion type planetary-gear set of the Ravigneaux-type compound planetary-gear train;

VI) Unfavorable gear strength and life, carrier rigidity, and the like, since torque increased by a single-pinion type planetary-gear set or reduction gear is input to a sun gear of the Ravigneaux-type compound planetary-gear train, which increases a tangential force with respect to ring-gear input;

VII) Enlargement of the Ravigneaux-type compound planetary-gear train and thus the transmission, since both achievement of the mechanical strength of the compound planetary-gear train at first speed, such as gear strength and life, and enhancement in carrier rigidity are required; and VIII) Poor fuel consumption, since the Ravigneaux-type compound planetary-gear train has torque circulation occurring at certain speeds to reduce the transfer efficiency thereat.

In other words, the gear change-speed unit comprising single-pinion type planetary-gear set and Ravigneaux-type compound planetary-gear train not only loses the advantages I) and II) provided by the gear change-speed unit comprising single-pinion type planetary-gear set and Simpson-type planetary-gear train, but also fails to solve the problems III) and IV), since enlargement of the Ravigneaux-type compound planetary-gear train leads to inevitable enlargement of the transmission.

It is an object of the present invention to provide a gear change-speed unit for an automatic transmission, which allows excellent fuel consumption and higher gear-ratio selection flexibility without any increase in size while maintaining the strength advantage of the gear train. Another object of the present invention is to provide a gear change-speed unit for an automatic transmission having excellent vehicle mountability.

The present invention provides generally a gear change-speed unit for an automatic transmission, which comprises: an input part which receives rotation of a power source; an output part arranged coaxially with the input part; planetary-gear sets which provide transfer paths between the input and output parts; and clutches and brakes arranged to be engaged and released selectively, the clutches and brakes selecting one of the transfer paths of the planetary-gear sets to change rotation of the input part at a corresponding gear ratio and provide it to the output part, the clutches and brakes allowing at least 6 forward speeds and 1 reverse speed by a combination of engagement and release of the clutches and brakes, wherein the first planetary-gear set comprises a first sun gear, a first pinion meshed with the first sun gear, a first ring gear meshed with the first pinion, and a first carrier supporting the first pinion, the first planetary-gear set reducing input rotation at all times, the second planetary-gear set comprises a second sun gear, a second pinion meshed with the second sun gear, a second ring gear meshed with the second pinion, and a second carrier supporting the second pinion, and the third planetary-gear set comprises third and fourth sun gears, a third pinion meshed with the third and fourth sun gears, a third ring gear meshed with the third pinion, and a third carrier receiving and providing rotation between the third and fourth sun gears through a center member coupled to a side member which rotatably supports the third pinion, the third sun gear being close to the input part, the fourth sun gear being distant from the input part, wherein the second and third planetary-gear sets constitute a change-speed planetary-gear set, and wherein the first, second, and third planetary-gear sets are disposed in parallel in this order from the side of the input part.

BRIEF DESCRIPTION OF THE DRAWINGS

The other objects and features of the present invention will become apparent from the following description with reference to the accompanying drawings, wherein:

FIG. 11 is a table similar to FIG. 2, illustrating a performance comparison between the gear change-speed unit comprising Ravigneaux-type compound planetary-gear train and the gear change-speed unit comprising Ishimaru-type planetary-gear train;

DETAILED DESCRIPTION OF THE INVENTION

Figures 1, 2:
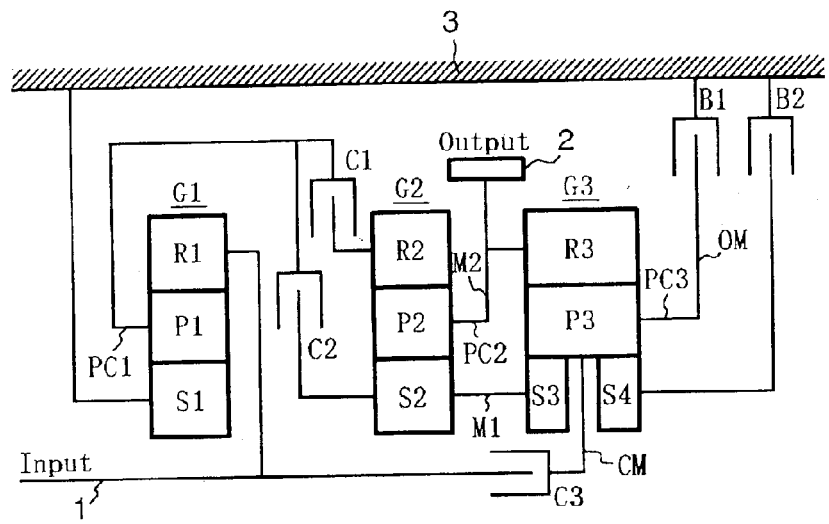
FIG. 1 is a block diagram showing a first embodiment of a gear change-speed unit for an automatic transmission according to the present invention.
FIG. 2 is an engagement logic table illustrating the relationship between engagement of friction elements of the gear change-speed unit and selection of a gear ratio.

Referring to the drawings, a description is made about the gear change-speed unit embodying the present invention.

Referring to FIG. 1, there is shown first embodiment of the present invention. The gear change-speed unit comprises a first planetary-gear set G1, a second planetary-gear set G2; a third planetary-gear set G3, a first coupling member M1, a second coupling member M2, a first clutch C1, a second clutch C2, a third clutch C3, a first brake B1, a second brake B2, an input part "Input" or input shaft 1, and output part "Output" or output gear 2.

The gear change-speed unit of the reduction single-pinion type so-called has first planetary-gear set or reduction planetary-gear set G1 comprising a single-pinion type planetary-gear set and serving as a reduction gear, second planetary-gear set G2 of the single-pinion type, and third planetary-gear set G3 of the double-sun-gear type arranged coaxially in this order from a left end or end close to the input part "Input" in FIG. 1. The first planetary-gear set G1 constitutes a reduction planetary-gear set, whereas the second planetary-gear set G2 and the third planetary-gear set G3 constitute a change-speed planetary-gear set (refer hereafter to as Ishimaru-type planetary-gear train occasionally).

The first planetary-gear set G1 comprises a single-pinion type planetary-gear set including a first sun gear S1, a first ring gear R1, a first pinion P1 meshed with the gears S1, R1, and a first carrier PC1 for rotatably supporting the first pinion P1. The second planetary-gear set G2 comprises a single-pinion type planetary-gear set including a second sun gear S2, a second ring gear R2, a second pinion P2 meshed with the gears S2, R2, and a second carrier PC2 for rotatably supporting the second pinion P2. The third planetary-gear set G3 comprises a double-sun-gear type planetary-gear set including a third sun gear S3 close to the input part "In put" and a fourth sun gear S4 distant therefrom, a third pinion P3 meshed with the sun gears S3, S4, a third carrier PC3 for rotatably supporting the third pinion P3, and a third ring gear R3 meshed with the third pinion P3. The third and fourth sun gears S3, S4 are arranged coaxially, but do not necessarily require the same number of teeth. Provided to the third carrier PC3 are a center member CM extending therefrom radially inward through a space between the sun gears S3, S4, and an outer member OM extending therefrom radially outward. Actually, the outer member OM is in specific disposition as will be described later. The center member CM is integrated with the third carrier PC3, and is disposed to pass through a space defined between adjacent teeth of the third pinion P3 located on an arrangement pitch circle thereof and extend radially inward through a space between the sun gears S3, S4.

The input part "Input" comprises input shaft 1 which is coupled to the first ring gear R1, and also to a unillustrated engine or power source through a unillustrated torque converter so as to provide engine rotation to the first ring gear R1 through the input shaft 1. The output part "Output" comprises output gear 2 which is coaxially coupled to the second coupling member M2 for providing coupling between the second carrier PC2 and the third ring gear R3 and forming an integrated unit thereof so as to transfer transmission output rotation of the output gear 2 to automotive driving wheels through a final-gear set and a differential-gear device, not shown. The first coupling member M1 is a coupling member for providing integral coupling between the second sun gear S2 and the third sun gear S3 to form an integral unit thereof.

In the first planetary-gear set G1, the first sun gear S1 is coupled to a transmission casing 3 for fixing at all times, whereas the first carrier PC1 can be coupled as required to the second ring gear R2 through the first clutch C1 and also to the second sun gear S2 through the second clutch C2. The center member CM of the third carrier PC3 can be coupled as required to the input shaft 1 through the third clutch C3. In the third planetary-gear set G3, the outer member OM of the third carrier PC3 can be coupled as required to the transmission casing 3 through the first brake B1 so as to achieve fixing of the third carrier PC3 as required, whereas the fourth sun gear S4 can be coupled as required to the transmission casing 3 through the second brake B2 so as to achieve fixing of the fourth sun gear S4 as required.

By engaging or releasing the clutches C1, C2, C3 and the brakes B1, B2 in the combination shown in FIG. 2, the gear change-speed unit constructed as described above can select corresponding speed. Note that in FIG. 2, cells with circle designate engagement, and cells with no circle designate release. A unillustrated control-valve body for shift control is connected to the clutches C1, C2, C3 and the brakes B1, B2 to achieve an engagement logic for this shifting. The control-valve body may be of the hydraulically controlled type, the electronically controlled type, or the combined type having the features of the two.

Figure 3:
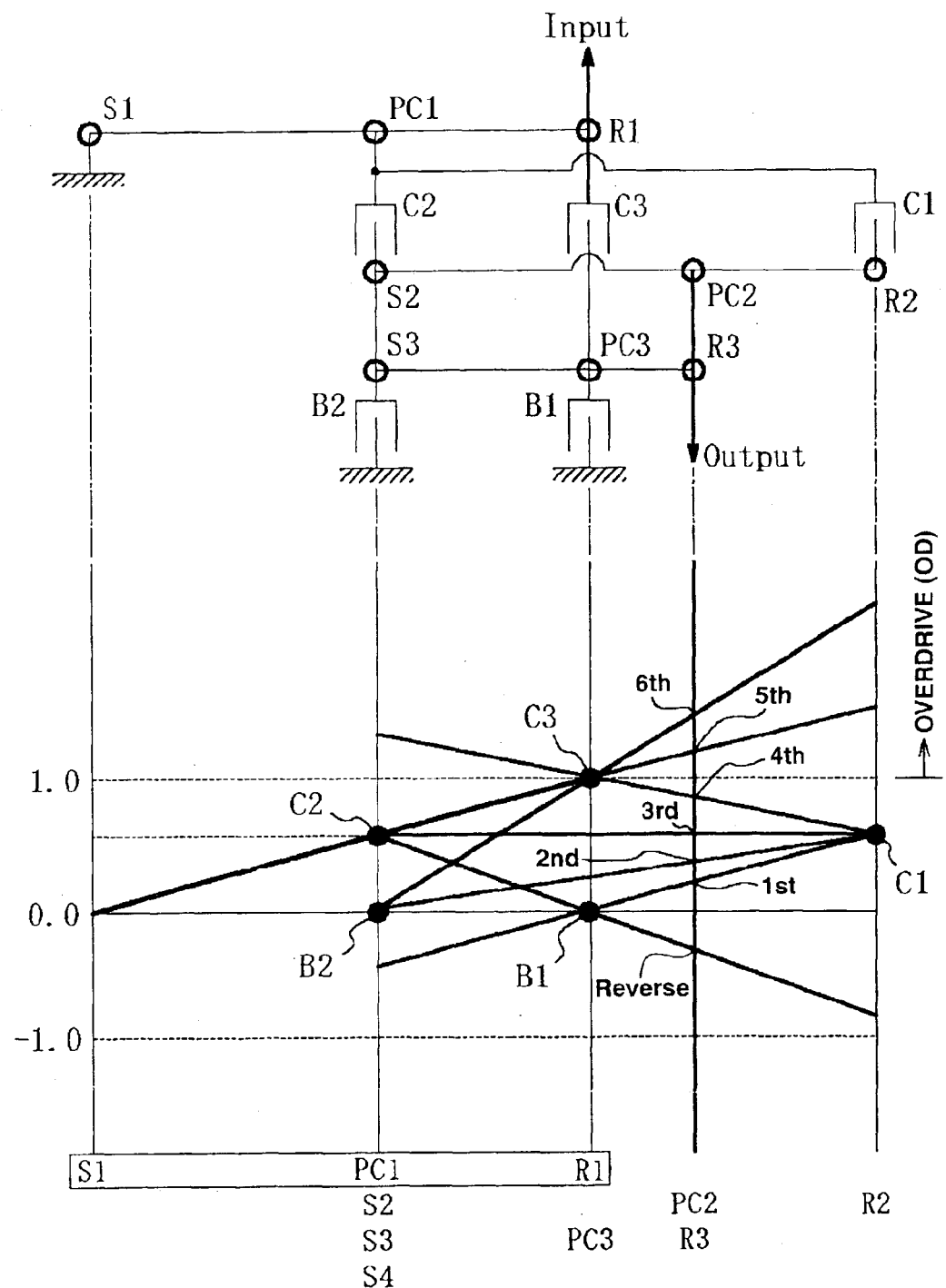
FIG. 3 is an alignment chart showing the rotating state of rotary members of the gear change-speed unit at each speed.

Referring to FIGS. 2–6, shift operation of the gear change-speed unit is described. Referring to FIG. 3 which is an alignment chart showing the rotating state of rotary members of the gear change-speed unit at each speed, the boldest line is involved in the first planetary-gear set G1, and the bold line is involved in the change-speed planetary-gear set comprising second and third planetary-gear sets G2, G3. Referring to FIGS. 4A–6 which are block diagrams showing torque-transfer paths in the gear change-speed unit at respective speeds, the bold line shows a torque-transfer path of the clutches, brakes, and members, and the hatching shows gears involved in torque transfer.

First speed: As shown in FIG. 2, first speed is obtained by engagement of the first clutch C1 and the first brake B1. At first speed, in the second planetary-gear set G2, engagement of the first clutch C1 causes input of reduced rotation of the first planetary-gear set G1 to the second ring gear R2. On the other hand, in the third planetary-gear set G3, since engagement of the first brake B1 causes fixing of the third carrier PC3 to the transmission casing 3, the third sun gear S3 produces reverse-direction reduced rotation with respect to output rotation of the third ring gear R3. Rotation of the third sun gear S3 is transferred to the second sun gear S2 of the second planetary-gear set G2 through the first coupling member M1.

Thus, the second planetary-gear set G2 receives normal-direction reduced rotation through the second ring gear R2 and reverse-direction reduced rotation through the second sun gear S2. Rotation obtained by further decreasing reduced rotation of the second ring gear R2 is provided to the output gear 2 through the second carrier PC2 and the second coupling member M2. That is, as shown in FIG. 3, first speed is defined by the line connecting an engagement point of the first clutch C1 where reduced rotation of the first planetary-gear set G1 is input to the second ring gear R2 and an engagement point of the first brake B1 where rotation of the third carrier PC3 is stopped. And input rotation of the input shaft 1 is reduced and provided through the output gear 2.

Figure 4A:
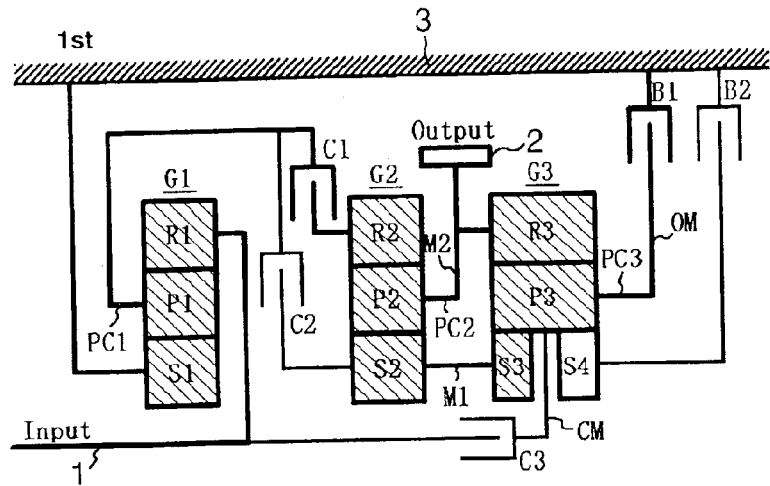
FIGS. 4A–4C are diagrams similar to FIG. 1, showing torque-transfer paths in the gear change-speed unit at first, second, and third forward speeds, respectively.

A torque-transfer path at first speed is as shown in FIG. 4A. Thus, torque acts on the first clutch C1, first brake B1, and members shown by the bold line and the first, second, and third planetary-gear sets G1, G2, G3 (except the fourth sun gear S4) shown by the hatching. Specifically, at first speed, the first planetary-gear set G1 and the second and third planetary-gear sets G2, G3 constituting the Ishimaru-type planetary-gear train are involved in torque transfer.

Second speed: As shown in FIG. 2, second speed is obtained by releasing the first brake B1 as engaged at first speed and engaging the second brake B2, i.e. by engagement of the first clutch C1 and the second brake B2. At second speed, in the second planetary-gear set G2, engagement of the first clutch C1 causes input of reduced rotation of the first planetary-gear set G1 to the second ring gear R2. On the other hand, in the third planetary-gear set G3, engagement of the second brake B2 causes fixing of the fourth sun gear S4 to the transmission casing 3, thus achieving fixing of the third sun gear S3 coupled to the third pinion P3. This causes fixing of the second sun gear S2 coupled to the third sun gear S3 through the first coupling member M1.

Thus, the second planetary-gear set G2 receives normal-direction reduced rotation through the second ring gear R2, and has the second sun gear S2 fixed to the transmission casing 3. Rotation obtained by further decreasing reduced rotation of the second ring gear R2 is provided to the output gear 2 through the second carrier PC2 and the second coupling member M2. That is, as shown in FIG. 3, second speed is defined by the line connecting the engagement point of the first clutch C1 where reduced rotation of the first planetary-gear set G1 is input to the second ring gear R2 and an engagement point of the second brake B2 where rotation of the fourth sun gear S4 is stopped. And input rotation of the input shaft 1 is reduced and provided through the output gear 2. Note that a reduction amount at second speed is smaller than that at first speed.

Figure 4B:
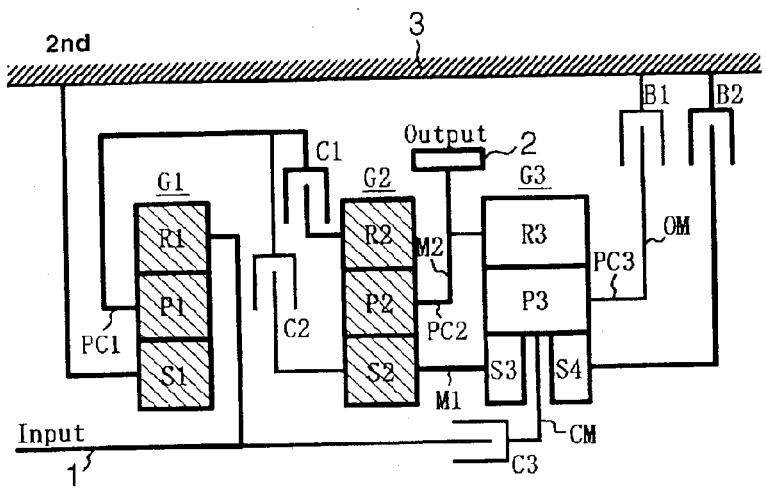

A torque-transfer path at second speed is as shown in FIG. 4B. Thus, torque acts on the first clutch C1, second brake B1, and members shown by the bold line and the first and second planetary-gear sets G1, G2 shown by the hatching. With the third planetary-gear set G3, the non-fixed third pinion P3, which revolves simply around the fixed sun gears S3, S4 with output rotation of the third ring gear R3, is not involved in torque transfer though it functions as a rotary member.

Third speed: As shown in FIG. 2, third speed is obtained by releasing the second brake B2 as engaged at second speed and engaging the second clutch C2, i.e. by engagement of the first and second clutches C1, C2. At third speed, in the second planetary-gear set G2, engagement of the first clutch C1 causes input of reduced rotation of the first planetary-gear set G1 to the second ring gear R2. Simultaneously, engagement of the second clutch C2 causes input of this reduced rotation to the second sun gear S2 of the second planetary-gear set G2.

Thus, the second planetary-gear set G2 receives the same reduced rotation through the second ring gear R2 and the second sun gear S2. Reduced rotation of the second carrier PC2 which rotates together with the gears R2, S2 is provided to the output gear 2 through the second coupling member M2. Note that this reduced rotation is the same as that of the first planetary-gear set G1. That is, as shown in FIG. 3, third speed is defined by the line connecting the engagement point of the first clutch C1 where reduced rotation of the first planetary-gear set G1 is input to the second ring gear R2 and an engagement point of the second clutch C2 where reduced rotation of the first planetary-gear set G1 is input to the second sun gear S2. And input rotation of the input shaft 1 is reduced and provided through the output gear 2. Note that this input rotation is reduced at the same reduction ratio as that of the first planetary-gear set G1.

Figure 4C:
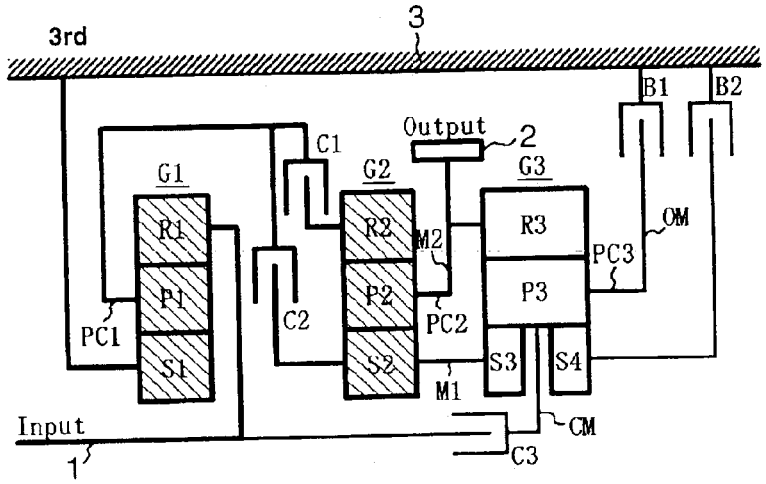

A torque-transfer path at third speed is as shown in FIG. 4C. Thus, torque acts on the first and second clutches C1, C2 and members shown by the bold line and the first and second planetary-gear sets G1, G2 shown by the hatching. The third planetary-gear set G3 is not involved in torque transfer.

Fourth speed: As shown in FIG. 2, fourth speed is obtained by releasing the second clutch C2 as engaged at third speed and engaging the third clutch C3, i.e. by engagement of the first and third clutches C1, C3. At fourth speed, in the second planetary-gear set G2, engagement of the first clutch C1 causes input of reduced rotation of the first planetary-gear set G1 to the second ring gear R2. On the other hand, in the third planetary-gear set G3, engagement of the third clutch C3 causes input of input rotation of the input shaft 1 to the third carrier PC3 through the center member CM. This increases rotation of the third sun gear S3 with respect to that of the third ring gear R3, which is transferred to the second sun gear S2 through the first coupling member M1.

Thus, the second planetary-gear set G2 receives reduced rotation through the second ring gear R2 and increased rotation through the second sun gear S2. Rotation obtained by increasing reduced rotation of the second ring gear R2 is provided to the output gear 2 through the second carrier PC2 and the second coupling member M2. Note that this increased rotation is lower than input rotation. That is, as shown in FIG. 3, fourth speed is defined by the line connecting the engagement point of the first clutch C1 where reduced rotation of the first planetary-gear set G1 is input to the second ring gear R2 and an engagement point of the third clutch C3 where rotation of the third carrier PC3 is input to the first carrier PC1. And input rotation of the input shaft 1 is slightly reduced and provided through the output gear 2.

Figure 5A:
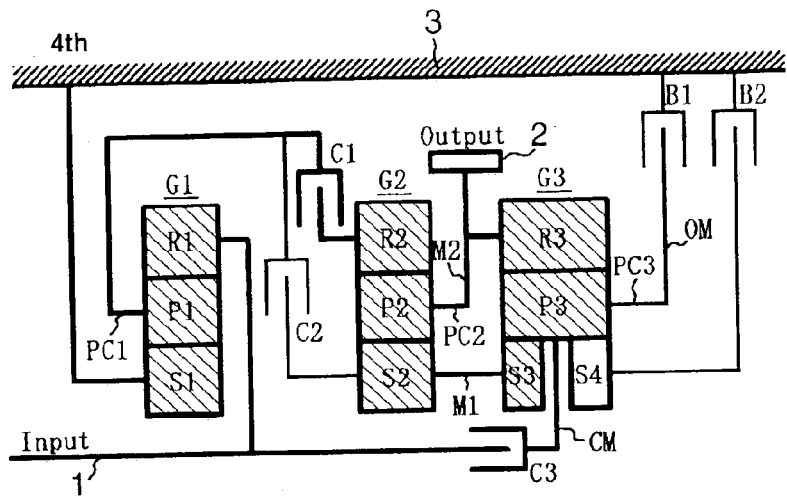
FIGS. 5A–5C are diagrams similar to FIG. 4C, showing torque-transfer paths in the gear change-speed unit at fourth, fifth, and sixth forward speeds, respectively.

A torque-transfer path at fourth speed is as shown in FIG. 5A. Thus, torque acts on the first and third clutches C1, C3 and members shown by the bold line and the first, second, and third planetary-gear sets G1, G2, G3 (except the fourth sun gear S4) shown by the hatching.

Fifth speed: As shown in FIG. 2, fifth speed is obtained by releasing the first clutch C1 as engaged at fourth speed and engaging the second clutch C2, i.e. by engagement of the second and third clutches C2, C3. At fifth speed, engagement of the second clutch C2 causes input of reduced rotation of the first planetary-gear set G1 to the third sun gear R3 through the second sun gear S2 and the first coupling member M1. Simultaneously, engagement of the third clutch C3 causes input of input rotation of the input shaft 1 to the third carrier PC3 through the center member CM.

Thus, the third planetary-gear set G3 receives input rotation through the third carrier PC3 and reduced rotation through the third sun gear S3. Increased rotation with respect to input rotation is provided to the output gear 2 through the third ring gear R3 and the second coupling member M2. That is, as shown in FIG. 3, fifth speed is defined by the line connecting the engagement point of the second cutch C2 where reduced rotation of first planetary-gear set G1 is input to the third sun gear S3 and the engagement point of the third clutch C3 where rotation of the third carrier PC3 is input to the first carrier PC1. And input rotation of the input shaft 1 is slightly increased and provided through the output gear 2.

Figure 5B:
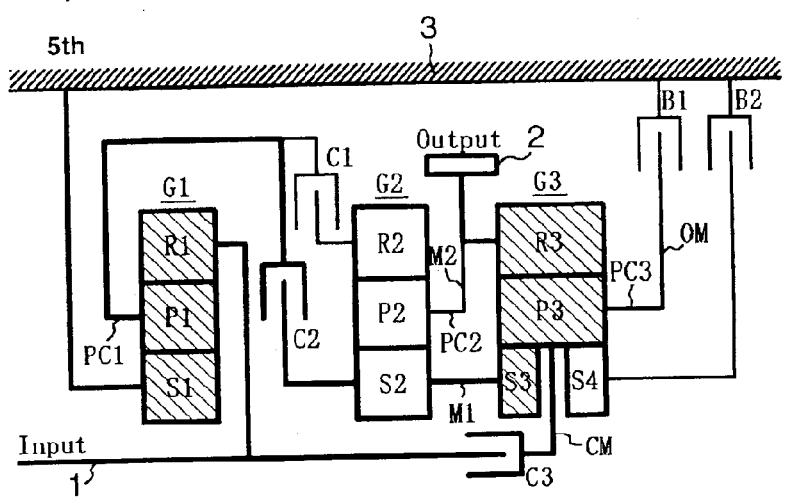

A torque-transfer path at fifth speed is as shown in FIG. 5B. Thus, torque acts on the second and third clutches C2, C3 and members shown by the bold line and the first and third planetary-gear sets G1, G3 (except the fourth sun gear S4) shown by the hatching.

Sixth speed: As shown in FIG. 2, sixth speed is obtained by releasing the second clutch C2 as engaged at fifth speed and engaging the second brake B2, i.e. by engagement of the third clutch C3 and the second brake B2. At sixth speed, engagement of the third clutch C3 causes input of input rotation of the input shaft 1 to the third carrier PC3 through the center member CM. Moreover, engagement of the second brake B2 causes fixing of the fourth sun gear S4 of the third planetary-gear set G3 to the transmission casing 3.

Thus, the third planetary-gear set G3 receives input rotation through the third carrier PC3, and has the fourth sun gear S4 fixed to the transmission casing 3. Increased rotation with respect to input rotation is provided to the output gear 2 through the third ring gear R3 and the second coupling member M2. That is, as shown in FIG. 3, sixth speed is defined by the line connecting the engagement point of the third clutch C3 where rotation of the third carrier PC3 is input to the first carrier PC1 and the engagement point of the second brake B2 where the fourth sun gear S4 is fixed to the transmission casing 3. And input rotation of the input shaft 1 is increased and provided through the output gear 2.

Figure 5C:
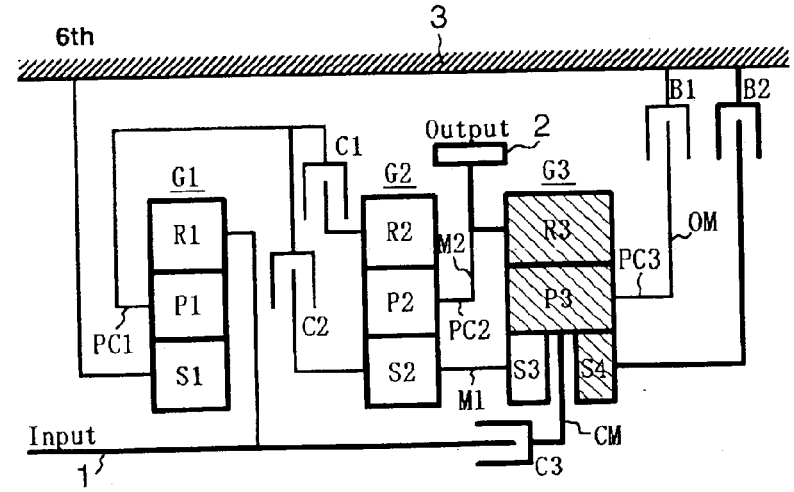

A torque-transfer path at sixth speed is as shown in FIG. 5C. Thus, torque acts on the third clutch C3, second brake B2, and members shown by the bold line and the third planetary-gear set G3 (except the third sun gear S3) shown by the hatching.

Reverse: As shown in FIG. 2, reverse speed is obtained by engaging the second clutch C2 and the first brake B1. At reverse speed, engagement of the second clutch C2 causes input of reduced rotation of the first planetary-gear set G1 to the third sun gear S3 through the second sun gear S2 and the first coupling member M1. Moreover, engagement of the first brake B1 causes fixing of the third carrier PC3 to the transmission casing 3.

Thus, the third planetary-gear set G3 receives normal-direction reduced rotation through the third sun gear S3, and has the third carrier PC3 fixed to the transmission casing 3. Reverse-direction reduced rotation of the third ring gear R3 is provided to the output gear 2 through the second coupling member M2. That is, as shown in FIG. 3, reverse speed is defined by the line connecting the engagement point of the second cutch C2 where reduced rotation of the first planetary-gear set G1 is input to the third sun gear S3 and the engagement point of the first brake B1 where rotation of the third carrier PC3 is stopped. And input rotation of the input shaft 1 is reduced in the reverses direction and provided through the output gear 2.

Figure 6:
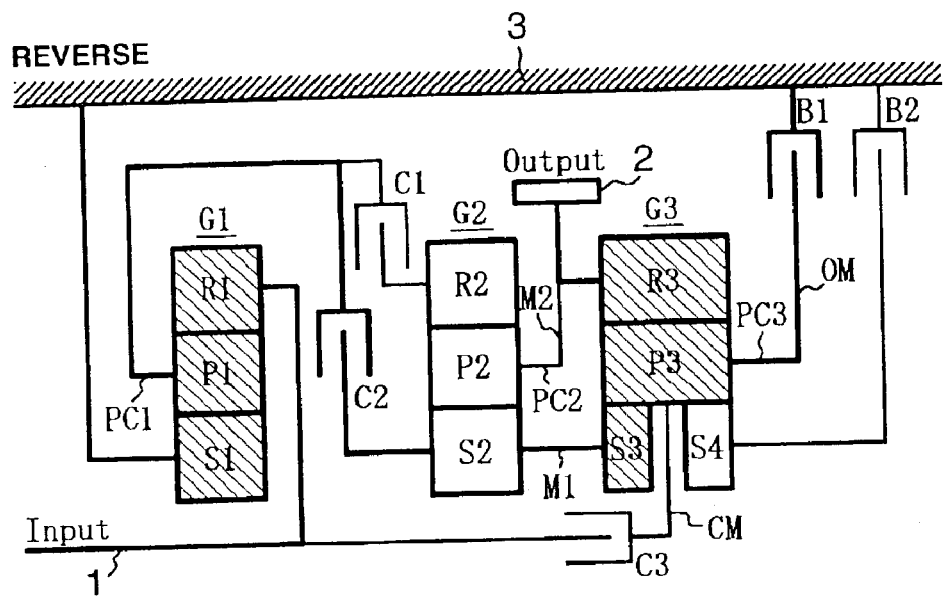
FIG. 6 is a diagram similar to FIG. 5C, showing a torque-transfer path in the gear change-speed unit at reverse speed.

A torque-transfer path at reverse speed is as shown in FIG. 6. Thus, torque acts on the second clutch C2, first brake B1, and members shown by the bold line and the first and third planetary-gear sets G1, G3 (except the fourth sun gear S4) shown by the hatching.

The essential concept of the gear change-speed unit of the present invention is to establish 6 forward speeds through three clutches and two brakes using essentially a combination of the reduction planetary-gear set and the Simpson-type compound planetary-gear train without producing the aforementioned problems III) and IV) of the Simpson-type planetary-gear train, nor any inevitable new problem when adopting the gear change-speed unit including reduction planetary-gear set and Ravigneaux-type compound planetary-gear train.

Making a comparison with the gear change-speed unit comprising Simpson-type planetary-gear train or Ravigneaux-type compound planetary-gear train, the advantages of the present invention over the reference are described.

Figure 8A:
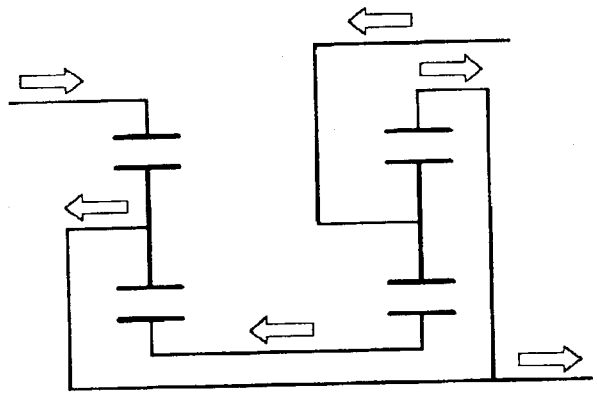
FIGS. 8A and 8B are schematic drawings showing torque-transfer paths in Simpson-type planetary-gear train and Ravigneaux-type compound planetary-gear train at first speed, respectively.
Figure 9:
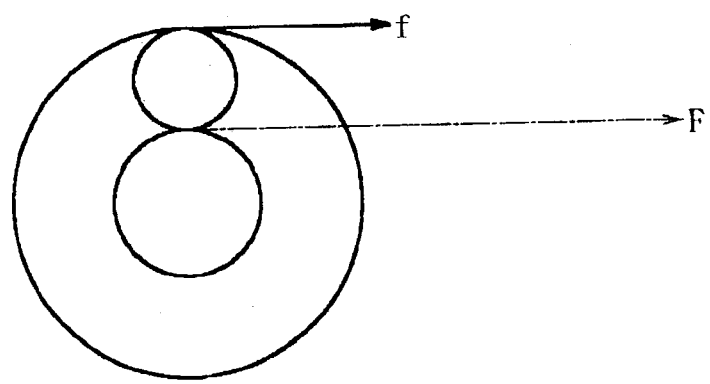
FIG. 9 is a drawing similar to FIG. 8B, explaining a difference in tangential force between carrier input and ring-gear input in a planetary-gear set.
Figure 10A:
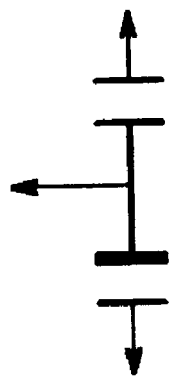
FIGS. 10A–10C are drawings similar to FIG. 9, explaining the advantage of the gear change-speed unit of the present invention with respect the gear change-speed unit comprising Simpson-type planetary-gear train.
Figure 10B:
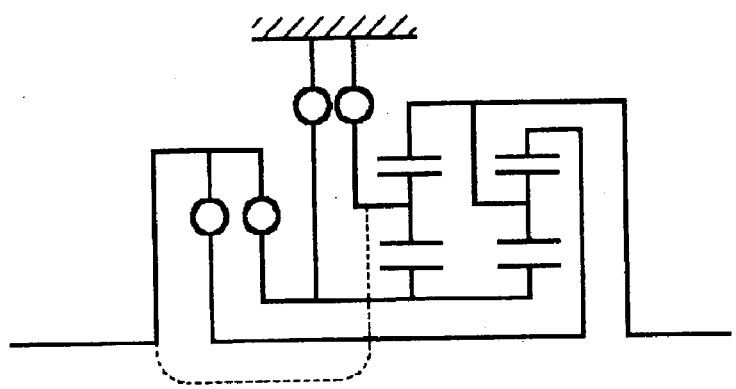

As described above, the Simpson-type planetary-gear train has the following advantages and disadvantage:

A) Favorable mechanical strength, since in the Simpson-type planetary-gear train, torque-transfer flow at first speed where torque becomes maximum is shared among all members as shown in FIG. 8A;

B) Favorable gear strength and life, carrier rigidity, and the like, since the Simpson-type planetary-gear train adopts ring-gear input, which allows a 50 percent reduction in tangential force with respect to sun-gear input. Specifically, referring to FIG. 9, when the same torque is input to the planetary-gear set, ring-gear input f is 1/2–1/2.5 smaller in tangential force than sun-gear input F; and C) Necessity of carrier input to the Simpson-type planetary-gear train so as to achieve overdrive speed. If input and output shafts are arranged coaxially, an input path to the carrier shown by the broken line in FIG. 10B cannot be established in the single-pinion type planetary-gear set having merely three rotary members as shown in FIG. 10A. Thus, there occurs the necessity of arrangement of the input and output shafts on different parallel axes so as to establish an input path to the carrier for actualization of overdrive speed. This results in an increase in radial dimension of the transmission.

Figure 7:
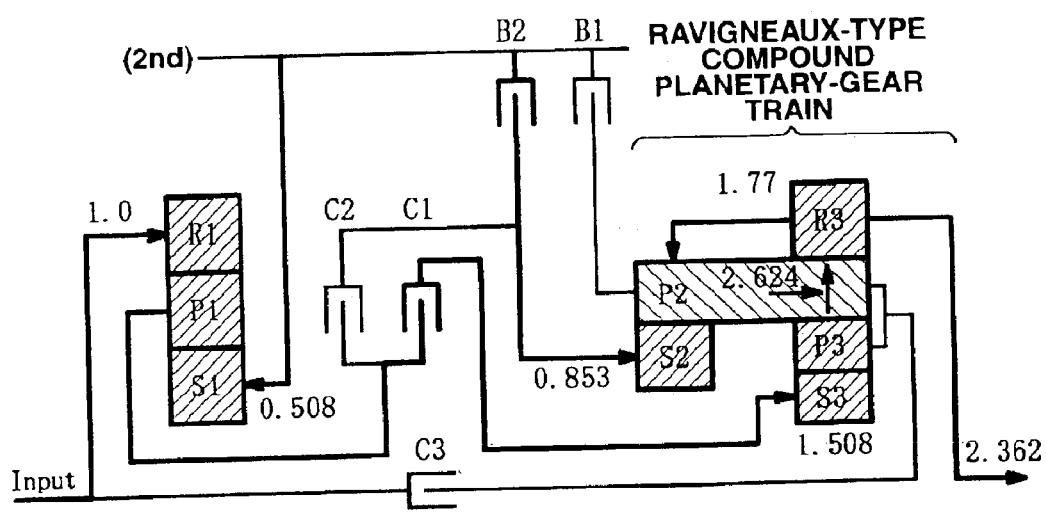
FIG. 7 is a diagram similar to FIG. 6, showing torque circulation occurring at second speed in a gear change-speed unit comprising a Ravigneaux-type compound planetary-gear train.
Figure 8B:
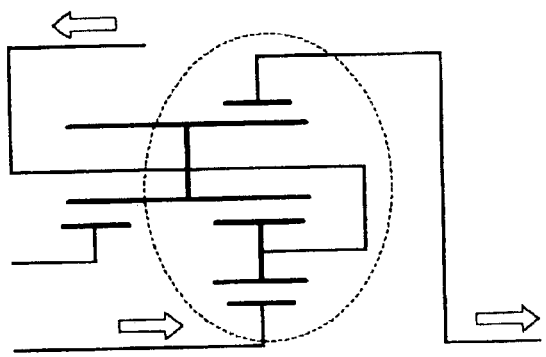

When adopting the gear change-speed unit comprising Ravigneaux-type compound planetary-gear train in place of Simpson-type planetary-gear train so as to eliminate the disadvantage C), the unit allows coaxial arrangement of the input and output shafts, but presents the following inconveniences:

D) Unfavorable mechanical strength, since maximum torque of the gear train (at first speed) is applied to one double-pinion type planetary-gear set of the Ravigneaux-type compound planetary-gear train as shown in FIG. 8B;

E) Unfavorable gear strength and life, carrier rigidity, and the like, since torque increased by a single-pinion type planetary-gear set or reduction planetary-gear set is input to a sun gear of the Ravigneaux-type compound planetary-gear train as shown in FIG. 7, which increases a tangential force with respect to ring-gear input for the reason described at B);

F) Enlargement of the Ravigneaux-type compound planetary-gear train and thus the transmission, since both achievement of the mechanical strength of the compound planetary-gear train at first speed, such as gear strength and life, and enhancement in carrier rigidity are required; and G) Poor fuel consumption, since the Ravigneaux-type compound planetary-gear train has torque circulation occurring at second speed as shown in FIG. 7 to reduce the transfer efficiency thereat. Referring to FIG. 7, torque circulation is derived from the third ring gear R3 where torque is diverged into output torque (2.362) and circulation torque (1.77). Circulation torque is internally circulated through the third ring gear R3 and the second pinion P2 when second speed is selected.

Figure 10C:
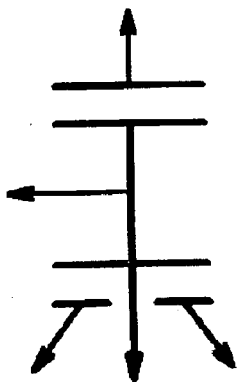

The Ishimaru-type planetary-gear train comprising second and third planetary-gear sets G2, G3 according to the present invention has the following features:

a) Possible arrangement of input and output parts in the same way as the Ravigneaux-type compound planetary-gear train while achieving carrier input which is indispensable for obtaining overdrive speed. Specifically, referring to FIG. 10C, the third planetary-gear set G3 constituting Ishimaru-type planetary-gear train is larger in the number of members such that (2 members out of the sun gear)+(1 member out of the ring gear)+(2 axial and radial members out of the carrier)=5 members, and allows, particularly, radial input between the two sun gears through the center member. This allows carrier input which actualizes higher gear ratios, e.g. fourth to sixth speeds in this embodiment;

b) Favorable mechanical strength, since maximum torque or first-speed transfer torque of the gear train is applied to both the second and third planetary-gear sets G2, G3 constituting Ishimaru-type planetary-gear train as shown in FIG. 4A to share first-speed torque among all members;

c) Favorable gear strength and life, carrier rigidity, and the like and thus possible downsizing, since, at first and second speeds where transfer torque is larger, torque increased by the first planetary-gear set G1 is input to the Ishimaru-type planetary-gear train through the second ring gear R2 as shown in FIGS. 4A and 4B, which allows a reduction in tangential force with respect to the Ravigneaux-type compound planetary-gear train which adopts sun-gear input;

d) Possible downsizing of the gear change-speed unit and thus the transmission, since the Ishimaru-type planetary-gear train is superior in mechanical strength and in gear strength and life, carrier rigidity, and the like to the Ravigneaux-type compound planetary-gear train, and allows coaxial arrangement of the input and output parts in the same way as the Ravigneaux-type compound planetary-gear train;

e) Excellent fuel consumption, since the Ishimaru-type planetary-gear train has no torque circulation occurring at second speed as shown in FIG. 4B, which contributes to enhancement in transfer efficiency with respect to the Ravigneaux-type compound planetary-gear train wherein torque circulation occurs at second speed. FIG. 11 shows a comparison between the Ravigneaux-type compound planetary-gear train and the Ishimaru-type pianetary-gear train when the gear ratio $\alpha$ (=sun-gear teeth number/ring-gear teeth number) is within a typically applicable range ($\alpha$=0.35–0.65) and that consideration is made about the preferable conditions that the gear-to-gear ratio is smaller as the gear ratio is higher. As for transfer efficiency at second speed, the transfer efficiency of the Ravigneaux-type compound planetary-gear train is 0.950 or 0.952 whereas the transfer efficiency of the Ishimaru-type planetary-gear train is 0.972 when the first planetary-gear set G1 is of the single-pinion type, and 0.968 when the first planetary-gear set G1 is of the double-pinion type.

f) Wide ratio coverage. The Ravigneaux-type compound planetary-gear train has a restriction affecting the setting of the gear ratio $\alpha$, i.e. the number of ring-gear teeth is fixed, so that when the gear ratio $\alpha$ is within a typically applicable range ($\alpha$=0.35–0.65) and that consideration is made about the preferable conditions that the gear-to-gear ratio is smaller as the gear ratio is higher, the available ratio coverage or gear-ratio width (=first-speed gear ratio/sixth-speed gear ratio) is between 4.81 minimum and 7.20 maximum as shown in FIG. 11. On the other hand, with the Ishimaru-type planetary-gear train wherein the gear ratios $\alpha 2$, $\alpha 3$ of the two planetary-gear sets G2, G3 can be set separately independently, the available ratio coverage is wider than that of the Ravigneaux-type compound planetary-gear train, i.e. between 4.81 minimum and 7.80 maximum when the first planetary-gear set G1 is of the single-pinion type, and between 5.08 minimum and 9.02 maximum when the first planetary-gear set G1 is of the double-pinion type as shown in FIG. 11. This results in enhanced gear-ratio selection flexibility as shown by the values in FIG. 2, for example. Note that in FIG. 2, the values of 5.5–7.0 in the uppermost column designate ratio coverage.

As is seen from the foregoing, the first embodiment produces the following effects:

i) Strength advantage of the change-speed planetary-gear set, such as gear strength and life, since the change-speed planetary-gear set is constructed by the two planetary-gear sets G2, G3 to serve as Ishimaru type planetary-gear train;

ii) Excellent fuel consumption, since the Ishimaru-type planetary-gear train is free from torque circulation occurring at second speed;

iii) Possible reduction in radial dimension of the transmission, since the input shaft 1 and the output gear 2 are arranged coaxially;

iv) Possible downsizing of the change-speed planetary-gear set, since the change-speed planetary-gear set is constructed to serve as Ishimaru type planetary-gear train, which allows a reduction in strength requirements. This cooperates with coaxial arrangement of the input shaft 1 and the output gear 2 to allow downsizing of the transmission;

v) Enhanced gear-ratio selection flexibility with respect to when using Ravigneaux-type compound planetary-gear train; and vi) Possible downsizing of the reduction planetary-gear set and thus the transmission, since the first planetary-gear set G1 serves as reduction planetary-gear set for reducing input rotation at all times.

Further, in the first embodiment, the gear change-speed unit comprises first, second, and third planetary-gear set G1, G2, G3. Thus, at first speed where torque becomes maximum, torque-transfer flow of the first planetary-gear set G1 is shared among all members of the second and third planetary-gear sets G2, G3, having the strength advantage. Moreover, the rotary members for receiving torque out of the first planetary-gear set G1 do not include sun gears of the second and third planetary-gear sets G2, G3, i.e. ring-gear input or carrier input is achieved, allowing a 50 percent reduction in tangential force, having the advantage in gear strength and life, carrier rigidity, and the like. That is, the first embodiment can maintain the aforementioned advantages I) and II) obtained when adopting the Simpson-type planetary-gear set.

Still further, in the first embodiment, the third planetary-gear set G3 of the two planetary-gear sets G2, G3 constituting change-speed planetary-gear set for carrying out change speed by torque input out of the first planetary-gear set G1 includes a double-sun-gear type planetary-gear set having two sun gears S3, S4, and the member for inputting/outputting rotation to the carrier PC3 of the third planetary-gear set G3 includes center member CM disposed between the sun gears S3, S4 and coupled to the carrier PC3. Thus, when actualizing overdrive speed, input rotation can be transferred to the carrier PC3 of the change-speed planetary-gear set through the center member CM disposed between the sun gears S3, S4 of the third planetary-gear set G3 without having parallel-axes arrangement of the input and output parts "Input", "Output". That is, overdrive speed can be actualized with the input and output parts arranged coaxially. This allows removal of the aforementioned problems III) and IV) associated with an increase in radial dimension of the transmission which is inevitable when adopting Simpson-type planetary-gear set.

Furthermore, since the solution of the problems III) and IV) is achieved by using the third planetary-gear set G3 without relying on the Ravigneaux-type compound planetary-gear train, the problems can be eliminated without involving a strength problem raised when using the Ravigneaux-type compound planetary-gear train, i.e. strength disadvantage due to maximum torque of the gear train (at first speed) being applied to only one double-pinion type planetary-gear set of the Ravigneaux-type compound planetary-gear train.

Further, when adopting the Ravigneaux-type compound planetary-gear train, torque increased by the reduction planetary-gear set is input to the sun gear of the Ravigneaux-type compound planetary-gear train, having greater tangential force with respect to ring-gear input and carrier input, resulting in disadvantage in gear strength and life, carrier rigidity, and the like. On the other hand, in the first embodiment adopting the third planetary-gear set G3, the problems III) and IV) can be eliminated without involving such disadvantage.

Still further, when adopting the Ravigneaux-type compound planetary-gear train, the planetary-gear train has torque circulation occurring at second speed to reduce the transfer efficiency, leading to poor fuel consumption. On the other hand, in the first embodiment adopting the third planetary-gear set G3, torque circulation does not occur to avoid poor fuel consumption.

Furthermore, in the first embodiment, the first planetary-gear set G1 includes a single-pinion type planetary-gear set, allowing a reduction in gear noise and number of parts, leading to enhancement in the transfer efficiency and thus fuel consumption.

Figure 12:
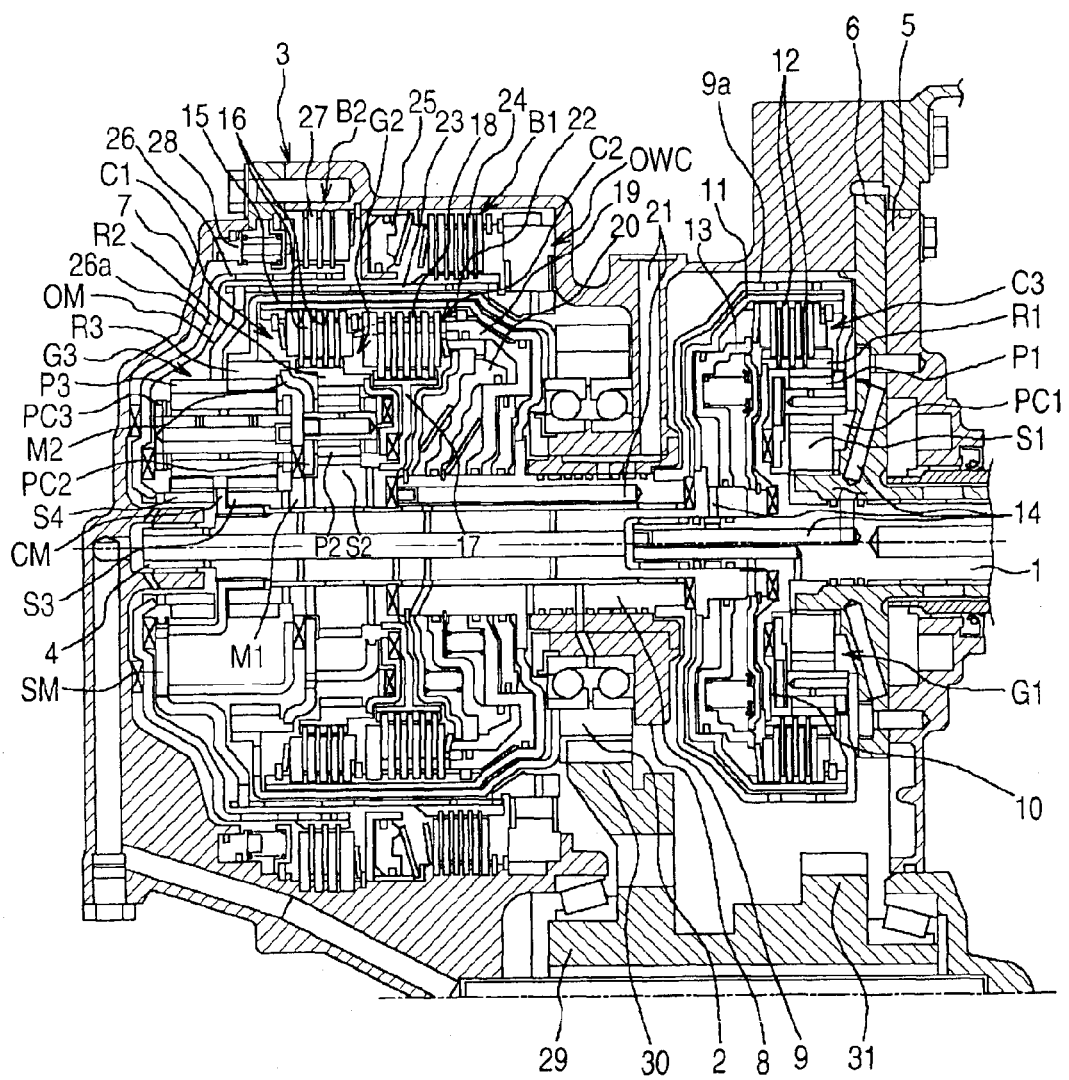
FIG. 12 is a longitudinal sectional view showing the gear change-speed unit in FIG. 1.

Referring to FIG. 12, the structure of the first embodiment is described in detail. Note that the input and output parts 1, 2 in FIG. 12 are reversed left to right with respect to those in FIGS. 1 and 4A–6. The input shaft 1 and an intermediate shaft 4 are arranged in the transmission casing 3 in the butt state allowing coaxial relative rotation, each shaft being supported rotatable separately with respect to the transmission casing 3. A front-end opening of the transmission casing 3 close to the input shaft 1 is concealed by a pump casing comprising a housing 5 and a cover 6. The input shaft 1, which is arranged through the pump casing for supporting, has a protruding end drivingly coupled to a unillustrated engine or power source through a unillustrated torque converter.

A rear end of the intermediate shaft 4 distant from the input shaft 1 is rotatably supported by an end cover 7 at a rear end of the transmission casing 3. An intermediate wall 8 is arranged in a roughly axially middle position of the transmission casing 3 to rotatably support the output gear 2. The intermediate wall 8 is formed with a center hole to rotatably support a butt portion of the input shaft 1 and the intermediate shaft 4 through a hollow shaft 9.

The first planetary-gear set G1 is disposed in a front space defined between the pump casing and the intermediate wall 8. The third clutch C3 is disposed to enclose the first planetary-gear set G1. The first planetary-gear set G1 has sun gear S1 fixedly mounted to the pump cover 6 so as to disable rotation at all times, and ring gear R1 couple to a flange 10 extending radially outward from the input shaft 1. A clutch drum 11 is arranged to extend radially outward from a front end of the intermediate shaft 4 close to the input shaft 1 so as to enclose the ring gear R1. A clutch pack 12 is arranged between the clutch drum 11 and the ring gear R1, and comprises a layered structure of clutch plates splined to the inner periphery of the clutch drum 11 and the outer periphery of the ring gear R1. The clutch drum 11 and the clutch pack 12 constitute third clutch C3. A piston 13 of the third clutch C3 is fitted in an end wall of the clutch drum 11 facing the first planetary-gear set G1, and makes stroke under the working oil pressure out of a hydraulic passage 14 formed through the pump cover 6, the input shaft 1, and the intermediate shaft 4 so as to allow engagement of the third clutch C3. A drum-shaped coupling member 9a is arranged to extend radially outward from a front end of the hollow shaft 9 so as to then enclose the third clutch C3, and has a front end coupled to the first carrier PC1.

The second and third planetary-gear sets G2, G3, the first and second clutches C1, C2, and the first and second brakes B1, B2 are disposed in a rear space defined between the intermediate wall 8 and the end cover 7. Specifically, the second and third planetary-gear sets G2, G3 are disposed on the intermediate shaft 4, wherein the second planetary-gear set G2 is closer to the input shaft 1 than the third planetary-gear set G3. The sun gears S2, S3 of the second and third planetary-gear sets G2, G3 are integrated through the first coupling member M1, and are rotatably supported on the intermediate shaft 4. A clutch drum 15 is arranged to extend radially outward from a roughly middle portion of the hollow shaft 9 and then axially backward to the outer periphery of the second ring gear R2. A clutch pack 16 is arranged between the clutch drum 15 and the ring gear R2, and comprises a layered structure of clutch plates splined to the inner periphery of the clutch drum 15 and the outer periphery of the ring gear R2. The clutch drum 15 and the clutch pack 16 constitute first clutch C1.

In order to dispose the second clutch C2 closer to the input shaft 1 than the first clutch C1 located at the outer periphery of the second planetary-gear set G2 as described above, a clutch hub 17 is fixedly mounted to the second sun gear S2 at an outer edge close to the input shaft 1 to extend radially outward. A clutch pack 18 is arranged between the clutch hub 17 and the clutch drum 15, and comprises a layered structure of clutch plates splined to the outer periphery of the clutch hub 17 and the inner periphery of the clutch drum 15. The clutch hub 17 and the clutch pack 18 constitute second clutch C2. Pistons 19, 20 of the first and second clutches C1, C2, which include a double piston wherein the clutch piston 20 slides inside the clutch piston 19, are disposed on the side of the second clutch C2 distant from the first clutch C1, so that the clutch piston 20 is fitted in an end wall of the clutch drum 15 facing the second planetary-gear set G2. The clutch pistons 19, 20 make stroke under the working oil pressure out of respective hydraulic passages 21 (one of which being shown in FIG. 12) formed through the intermediate wall 8 and the hollow shaft 9 so as to allow individual engagement of the first and second clutches C1, C2.

The third planetary-gear set G3 comprises a double-sun-gear type planetary-gear set as described above, wherein the ring gear R3 is smaller in teeth width than the pinion P3 to locate the ring gear R3 meshed with the pinion P3 at an end close to the second planetary-gear set G2, thus allowing shortening of the second coupling member M2 for coupling the ring gear R3 to the carrier PC2 of the second planetary-gear set G2. A cylindrical coupling member 22, which is disposed to enclose the clutch drum 15 of the first and second clutches C1, C2, has one end connected to the outer periphery of the ring gear R3 and another end connected to the output gear 2.

As described above, provided to the carrier PC3 of the third planetary-gear set G3 are center member CM extending radially inward from a side member SM for supporting the pinion P3 through a space between the sun gears S3, S4, and outer member OM extending radially outward from the carrier PC3 in the roughly axially middle position of the pinion P3 along an end face of the ring gear R3. The center member CM is drivingly coupled to the intermediate shaft 4, thereby coupling the carrier PC3 to the clutch drum 11 of the third clutch C3 through the center member CM and the intermediate shaft 4. A brake hub 23, which is coupled to the outer periphery of the outer member OM, is disposed at the outer periphery of the coupling member 22 to extend forward so as to approach the intermediate wall 8. A brake pack 24 is arranged between the brake hub 23 and the transmission casing 3, and comprises a layered structure of brake plates splined to the outer periphery of a front end of the brake hub 23 and the inner periphery of the transmission casing 3, thereby constituting the first brake B1. The first bake B1 can be engaged as required by a brake piston 25 fitted in the transmission casing 3 at a rear position of the brake pack 24.

A brake hub 26 is arranged to conceal a rear end of the brake hub 23, and has a rear-end wall 26a to extend circumferentially inward along the back of the third planetary-gear set G3. The inner periphery of the rear-end wall 26a is coupled to the sun gear S4 of the third planetary-gear set G3. A brake pack 27 is arranged between the brake hub 26 and the transmission casing 3, and comprises a layered structure of brake plates splined to the outer periphery of the brake hub 26 and the inner periphery of the transmission casing 3, thereby constituting the second brake B2. The second bake B2 can be engaged as required by a brake piston 28 fitted in the transmission casing 3 at a rear position of the brake pack 27. Thus, the first and second brakes B1, B2 are disposed at the outer peripheries of the first and second clutches C1, C2, respectively, wherein the first brake B1 is closer to the input shaft 1 or the first planetary-gear set G1 than the second brake B2, and wherein the first and second brakes B1, B2 are closer to the second planetary-gear set G2 than the third planetary-gear set G3.

As is not shown in FIGS. 1 and 4A–6, a one-way clutch OWC is arranged between a front end of the brake hub 23 constituting the first brake B1 and the transmission casing 3, wherein first forward speed is achieved with the first brake B1 released and with one-direction rotation of the third carrier PC3 blocked by the one-way clutch OWC. At first speed achieved by the one-way clutch OWC, the clutch OWC allows reverse rotation of the third carrier PC3 during engine brake to obtain no engine brake, so that upon request of engine brake, the first brake B1 is engaged to block reverse rotation of the third carrier PC3. A countershaft 29 is rotatably arranged in the transmission casing 3 to be parallel to the input shaft 1 and the intermediate shaft 4, and it has a counter gear 30 and a final drive pinion 31 integrated therewith. The counter gear 30 is meshed with the output gear 2, whereas the final drive pinion 31 is meshed with a differential-gear device, not shown, arranged between the automotive driving wheels.

The first embodiment produces the following effects, since the first, second, and third planetary-gear sets, i.e. reduction planetary-gear set G1, single-pinion type planetary-gear set G2, and double-sun-gear type planetary-gear set G3, are arranged in parallel in this order from the side of the input shaft 1. That is, due to higher flexibility of layout of the ring gear R3 about the axial position at the outer periphery of the third planetary-gear set G3 located at the rear end the most distant from the input shaft 1, the ring gear R3 can be positioned closer to the input shaft 1 as shown in FIG. 12 to mesh with the pinion P3. And the member for coupling the carrier PC3 of the third planetary-gear set G3 to the first brake B1 (brake hub 23) for fixing the carrier PC3 includes outer member OM which extends radially outward from the carrier PC3 in the roughly axially middle position of the pinion P3 along the end face of the ring gear R3 displaced forward or in the direction of the second planetary-gear set G2 and meshed with the pinion P3. Therefore, the transmission casing 3 (end cover 7) in the vicinity of the outer periphery of the rear end of the third planetary-gear set G3 can radially be narrowed as shown in FIG. 12 without interference from the ring gear R3 and the outer member OM. As a result, when achieving horizontal disposition in an automotive engine room, the gear change-speed unit can be reduced in the outer periphery of the end portion (end cover 7) distant from the input shaft 1 so as not to interfere with vehicle-body members protruding in the engine room, providing enhanced vehicle mountability in addition to the advantages as described with reference to FIGS. 1 and 4A–6. Moreover, due to a large space which the above arrangement of the ring gear R3 and the outer member OM provides in the vicinity of the outer periphery of the rear end of the third planetary-gear set G3, the end wall 26a of the brake hub 26 connecting the fourth sun gear S4 and the second brake B2 for fixing thereof can be bent in such a way as to enter the space, resulting in sure radial narrowing of the transmission casing 3 (end cover 7) in the vicinity of the outer periphery of the rear end of the third planetary-gear set G3 as shown in FIG. 12.

Further, the two of the three clutches C1, C2, C3, i.e. first and second clutches C1, C2 for distributing output rotation of the first planetary-gear set G1 to the change-speed planetary-gear set comprising second and third planetary-gear sets G2, G3 are disposed closer to the second planetary-gear set G2 than the third planetary-gear set G3. Therefore, the clutches C1, C2 are disposed closer to the input shaft 1, allowing enlargement of a possible area of radially narrowing the transmission casing 3 (end cover 7) in the vicinity of the outer periphery of the rear end of the third planetary-gear set G3 regardless of presence of the first and second clutches C1, C2, resulting in further enhanced vehicle mountability of the gear change-speed unit when horizontally disposed in the engine room. Still further, the above disposition of the first and second clutches C1, C2 allows the clutches C1, C2 to approach the first planetary-gear set G1, reducing the length of the members (hollow shaft 9 and clutch drum 15) for coupling the clutches C1, C2 to the first planetary-gear set G1, resulting in achievement of a reduction in length, size, and weight and a simplification of the coupling members. Furthermore, parallel arrangement of the first and second clutches C1, C2 allows double-piston structure of the clutch pistons 19, 20, leading not only to axial downsizing thereof, but also to reduction in number of parts due to common use of return springs and centrifugal-pressure cancel chambers of the pistons 19, 20 and thus to downsizing and cost reduction of the transmission.

Still further, in addition to the above disposition of the first and second clutches C1, C2, the pistons 19, 20 of the clutches C1, C2 are disposed on the side of the second planetary-gear set G2 distant from the third planetary-gear set G3. Therefore, the pistons 19, 20 are absent at the outer periphery of the third planetary-gear set G3, allowing radial narrowing of the transmission casing 3 (end cover 7) in the vicinity of the outer periphery of the rear end of the third planetary-gear set G3, resulting in further enhanced vehicle mountability of the gear change-speed unit when horizontally disposed in the engine room.

Furthermore, the third clutch C3 for directly providing rotation of the input shaft 1 to the change-speed planetary-gear set (carrier PC3 of the third planetary-gear set G3 in FIG. 12) comprising second and third planetary-gear sets G2, G3 is disposed at the outer periphery of the first planetary-gear set G1. Therefore, the third clutch C3 is located closer to the input shaft 1 than the first and second clutches C1, C2, allowing radial narrowing of the transmission casing 3 (end cover 7) in the vicinity of the outer periphery of the rear end of the third planetary-gear set G3, resulting in further enhanced vehicle mountability of the gear change-speed unit when horizontally disposed in the engine room. Moreover, this contributes not only to easy arrangement of the hydraulic passages 21, 14 for the clutches C1, C2, C3 and reduction in length difference therebetween, but also to improved controllability of the clutches and uniform response for shift in which the clutches are involved.

Further, the piston 13 of the third clutch C3 is disposed on the side of the first planetary-gear set G1 close to the second planetary-gear set G2. Therefore, the piston 13 of the third clutch C3 is disposed opposite and adjacent to the pistons 19, 20 of the first and second clutches C1, C2, resulting in sure achievement of the above effect of contributing not only to easy arrangement of the hydraulic passages 21, 14 for the clutches C1, C2, C3 and reduction in length difference therebetween, but also to improved controllability of the clutches and uniform response for shift in which the clutches are involved.

Still further, the hydraulic passage 21 for the first and second clutches C1, C2 are formed through the intermediate wall or output-gear support wall 8 provided to the transmission casing 3 between the first and second pianetary-gear sets G1, G2. This not only can reduce the length of the hydraulic passage 21 to be arranged between the control-valve body mounted to the transmission casing 3 in any given circumferential position and the first and second clutches C1, C2, but also can roughly equalize the lengths of the hydraulic passages 14, 21, resulting in uniform response for shift in which the clutches are involved. Moreover, the hydraulic passage 21 for the first and second clutches C1, C2, which serves to lead relatively high pressure due to large transfer torque of the clutches, is directly formed through the intermediate wall 8 having relatively large thickness for supporting the output gear 2 without any need of a separate and distinct reinforcing sleeve and the like, producing no increase in number of parts and manufacturing cost.

Furthermore, the first and second brakes B1, B2 for fixing the rotary members (carrier PC3 and sun gear S4 of the third planetary-gear set G3 in FIG. 12) of the change-speed planetary-gear set comprising second and third planetary-gear set G2, G3 are disposed closer to the second planetary-gear set G2 than the third planetary-gear set G3. Therefore, even if the two brakes B1, B2 are arranged in association with the change-speed planetary-gear set comprising second and third planetary-gear sets G2, G3, they are disposed closer to the input shaft 1, having no blocking of the above effect of allowing radial narrowing of the transmission casing 3 (end cover 7) in the vicinity of the outer periphery of the rear end of the third planetary-gear set G3, resulting in further enhanced vehicle mountability of the gear change-speed unit when horizontally disposed in the engine room. Moreover, this can roughly equalize the lengths of the hydraulic passages for the brakes B1, B2, resulting in uniform response for shift in which the brakes are involved.

Further, the first and second brakes B1, B2 are disposed at the outer periphery of the first and second clutches C1, C2. Therefore, the coupling members OM, 26a for coupling the rotary members (third carrier PC3 and sun gear S4) to be fixed by the brakes B1, B2 to the brakes B1, B2 can be disposed on the side of the third planetary-gear set G3 distant from the second planetary-gear set G2, i.e. on the rear side, facilitating provision of a mounting space of the coupling members OM, 26a.

Furthermore, the first brake B1 for fixing the carrier PC3 of the third planetary-gear set G3 is disposed closer to the first planetary-gear set G1 than the second brake B2 for fixing the sun gear S4 of the third planetary-gear set G3 distant from the second planetary-gear set G2. Therefore, when extending to the third planetary-gear set G3 distant from the input shaft 1 the coupling member OM for coupling the carrier PC3 of the third planetary-gear set G3 to be fixed by the first brake B1 to the first brake B1, and the coupling member 26a for coupling the sun gear S4 of the third planetary-gear set G3 distant from the second planetary-gear set G2 to be fixed by the second brake B2 to the second brake B2, arrangement of the coupling members OM, 26a is carried out easily in association with the positions of the carrier PC3 and the sun gear S4, and a reduction in length of the coupling members OM, 26a contributes greatly to enhancement in manufacturing cost, rigidity, and space efficiency.

Further, the hydraulic passage 21 for the first and second clutches C1, C2 is formed through the intermediate wall 8 for supporting the output gear 2, whereas the hydraulic passage 14 for the third clutch C3 is formed through the pump cover 6. Therefore, all the hydraulic passages are concentratedly arranged at the front of the transmission casing 3 which is advantageous for passing of the hydraulic pressure out of the control-valve body, allowing simplification of the shift control circuit.

Figure 13:
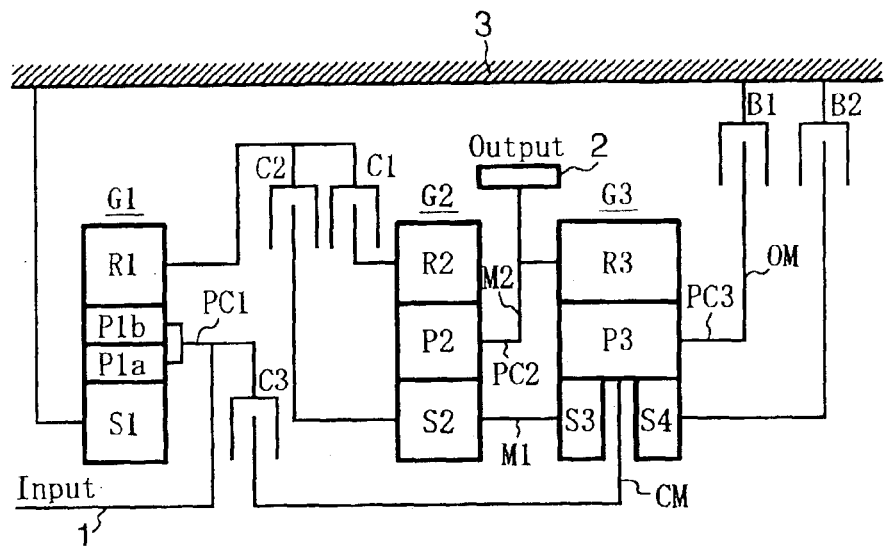
FIG. 13 is a diagram similar to FIG. 7, showing a second embodiment of the gear change-speed unit.

Referring to FIG. 13 wherein like reference numerals designate like parts in FIG. 1, there is shown second embodiment of the present invention which is substantially the same as the first embodiment. In the second embodiment, the gear change-speed unit comprises first planetary-gear set or reduction gear G1, second planetary-gear set G2 of the single-pinion type, and third planetary-gear set G3 of the double-sun-gear type arranged coaxially in this order from a left end or end close to the input part "Input" (input shaft 1) in FIG. 13. The second and third planetary-gear sets G2, G3, which are the same in structure as those described in connection with FIG. 1, constitute change-speed planetary-gear set or Ishimaru-type planetary-gear train. On the other hand, the first planetary-gear set G1 comprises, in place of a single-pinion type planetary-gear set as described in connection with FIG. 1, a double-pinion type planetary-gear set including first sun gear S1, first ring gear R1, two first pinions P1a, P1b meshed with the gears S1, R1, respectively, and first carrier PC1 for rotatably supporting the first pinions P1a, P1b.

In the second embodiment, therefore, the input shaft 1 is coupled to the first carrier PC1 to receive engine rotation, and the first sun gear S1 is coupled and fixed to the transmission casing 3 at all times. The first ring gear R1 can be coupled as required to the second ring gear R2 through the first clutch C1, and to the second sun gear S2 through the second clutch C2.

Figure 14:
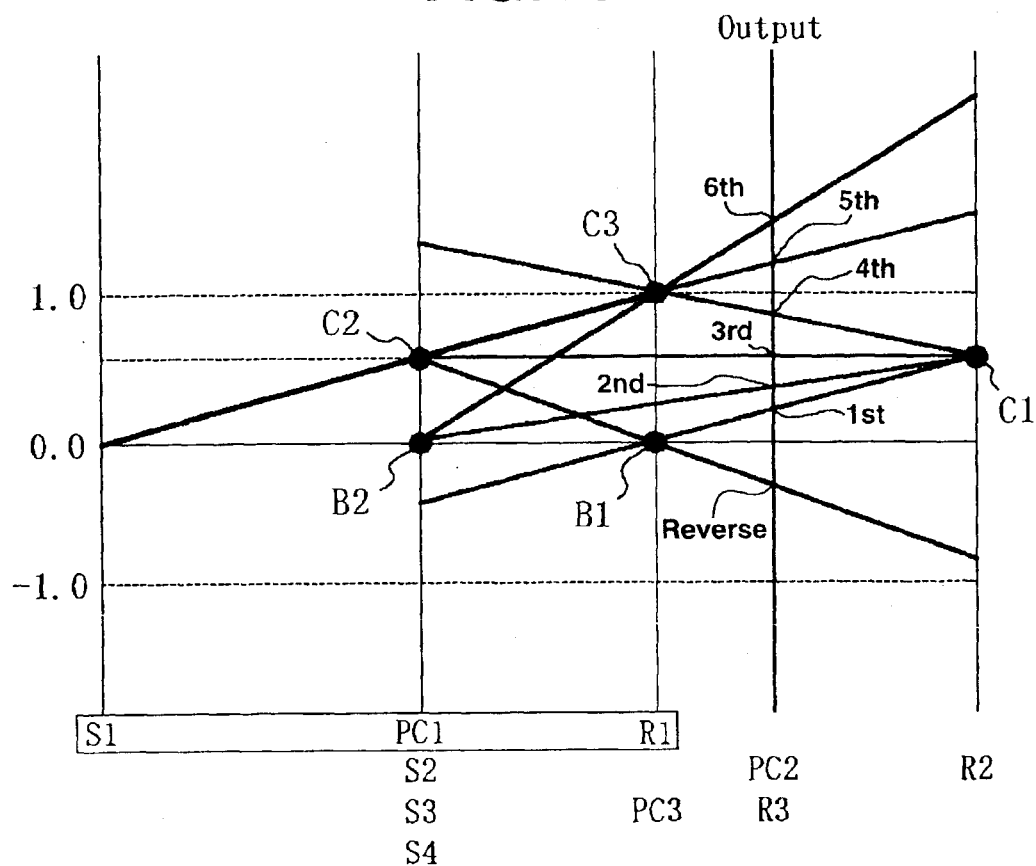
FIG. 14 is a chart similar to FIG. 3, showing the rotating state of rotary members of the gear change-speed unit in FIG. 13 at each speed.

In the second embodiment as well, by engaging or releasing the clutches C1, C2, C3 and the brakes B1, B2 in the combination shown in FIG. 2, the gear change-speed unit constructed as described above can select corresponding speed, i.e. one of first to sixth forward speeds and reverse speed. Referring to FIGS. 14–17, shift operation of the second embodiment is described. Referring to FIG. 14 which is an alignment chart showing the rotating state of the rotary members of the gear change-speed unit at each speed, the boldest line is involved in the first planetary-gear set G1, and the bold line is involved in the change-speed planetary-gear train comprising second and third planetary-gear sets G2, G3. Referring to FIGS. 15–17, the bold line shows a torque-transfer path of the clutches, brakes, and members, and the hatching shows gears involved in torque transfer.

First speed: As shown in FIG. 2, first speed is obtained by engagement of the first clutch C1 and the first brake B1. At first speed, in the second planetary-gear set G2, engagement of the first clutch C1 causes input of reduced rotation of the first planetary-gear set G1 to the second ring gear R2. On the other hand, in the third planetary-gear set G3, since engagement of the first brake B1 causes fixing of the third carrier PC3 to the transmission casing 3, the third sun gear S3 produces reverse-direction reduced rotation with respect to output rotation of the third ring gear R3. Rotation of the third sun gear S3 is transferred to the second sun gear S2 of the second planetary-gear set G2 through the first coupling member M1.

Thus, the second planetary-gear set G2 receives normal-direction reduced rotation through the second ring gear R2 and reverse-direction reduced rotation through the second sun gear S2. Rotation obtained by further decreasing reduced rotation of the second ring gear R2 is provided to the output gear 2 through the second carrier PC2 and the second coupling member M2. That is, as shown in FIG. 14, first speed is defined by the line connecting an engagement point of the first clutch C1 where reduced rotation of the first planetary-gear set G1 is input to the second ring gear R2 and an engagement point of the first brake BI where rotation of the third carrier PC3 is stopped. And input rotation of the input shaft 1 is reduced and provided through the output gear 2.

Figure 15A:
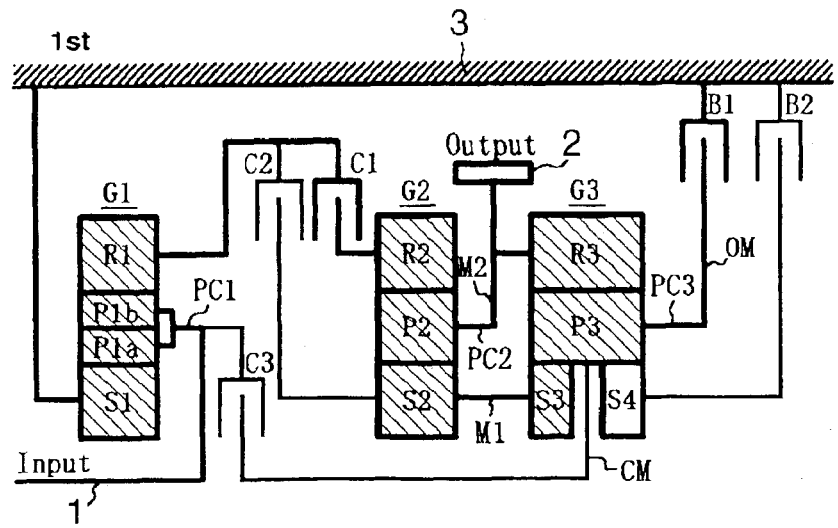
FIGS. 15A–15C are diagrams similar to FIG. 13, torque-transfer paths in the gear change-speed unit in FIG. 13 at first, second, and third forward speeds, respectively.

A torque-transfer path at first speed is as shown in FIG. 15A. Thus, torque acts on the first clutch C1, first brake B1, and members shown by the bold line and the first, second, and third planetary-gear sets G1, G2, G3 (except the fourth sun gear S4) shown by the hatching. Specifically, at first speed, the first planetary-gear set G1 and the second and third planetary-gear sets G2, G3 constituting the Ishimaru-type planetary-gear train are involved in torque transfer.

Second speed: As shown in FIG. 2, second speed is obtained by releasing the first brake B1 as engaged at first speed and engaging the second brake B2, i.e. by engagement of the first clutch C1 and the second brake B2. At second speed, in the second planetary-gear set G2, engagement of the first clutch C1 causes input of reduced rotation of the first planetary-gear set G1 to the second ring gear R2. On the other hand, in the third planetary-gear set G3, engagement of the second brake B2 causes fixing of the fourth sun gear S4 to the transmission casing 3, thus achieving fixing of the third sun gear S3 coupled to the third pinion P3. This causes fixing of the second sun gear S2 coupled to the third sun gear S3 through the first coupling member M1.

Thus, the second planetary-gear set G2 receives normal-direction reduced rotation through the second ring gear R2, and has the second sun gear S2 fixed to the transmission casing 3. Rotation obtained by further decreasing reduced rotation of the second ring gear R2 is provided to the output gear 2 through the second carrier PC2 and the second coupling member M2. That is, as shown in FIG. 14, second speed is defined by the line connecting the engagement point of the first clutch C1 where reduced rotation of the first planetary-gear set G1 is input to the second ring gear R2 and an engagement point of the second brake B2 where rotation of the fourth sun gear S4 is stopped. And input rotation of the input shaft 1 is reduced and provided through the output gear 2. Note that a reduction amount at second speed is smaller than that at first speed.

Figure 15B:
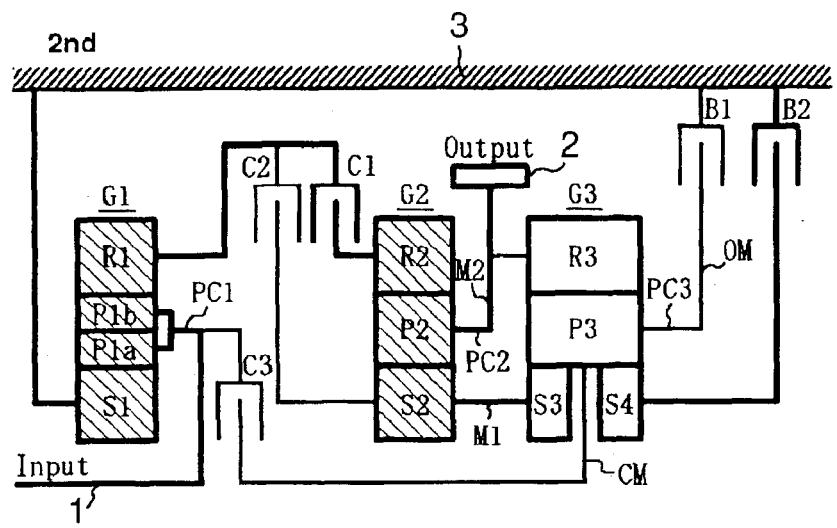

A torque-transfer path at second speed is as shown in FIG. 15B. Thus, torque acts on the first clutch C1, second brake B1, and members shown by the bold line and the first and second planetary-gear sets G1, G2 shown by the hatching. With the third planetary-gear set G3, the non-fixed third pinion P3, which revolves simply around the fixed sun gears S3, S4 with output rotation of the third ring gear R3, is not involved in torque transfer though it functions as a rotary member.

Third speed: As shown in FIG. 2, third speed is obtained by releasing the second brake B2 as engaged at second speed and engaging the second clutch C2, i.e. by engagement of the first and second clutches C1, C2. At third speed, in the second planetary-gear set G2, engagement of the first clutch C1 causes input of reduced rotation of the first planetary-gear set G1 to the second ring gear R2. Simultaneously, engagement of the second clutch C2 causes input of this reduced rotation to the second sun gear S2 of the second planetary-gear set G2.

Thus, the second planetary-gear set G2 receives the same reduced rotation through the second ring gear R2 and the second sun gear S2. Reduced rotation of the second carrier PC2 which rotates together with the gears R2, S2 is provided to the output gear 2 through the second coupling member M2. Note that this reduced rotation is the same as that of the first planetary-gear set G1. That is, as shown in FIG. 14, third speed is defined by the line connecting the engagement point of the first clutch C1 where reduced rotation of the first planetary-gear set G1 is input to the second ring gear R2 and an engagement point of the second clutch C2 where reduced rotation of the first planetary-gear set G1 is input to the second sun gear S2. And input rotation of the input shaft 1 is reduced and provided through the output gear 2. Note that this input rotation is reduced at the same reduction ratio as that of the first planetary-gear set G1.

Figure 15C:
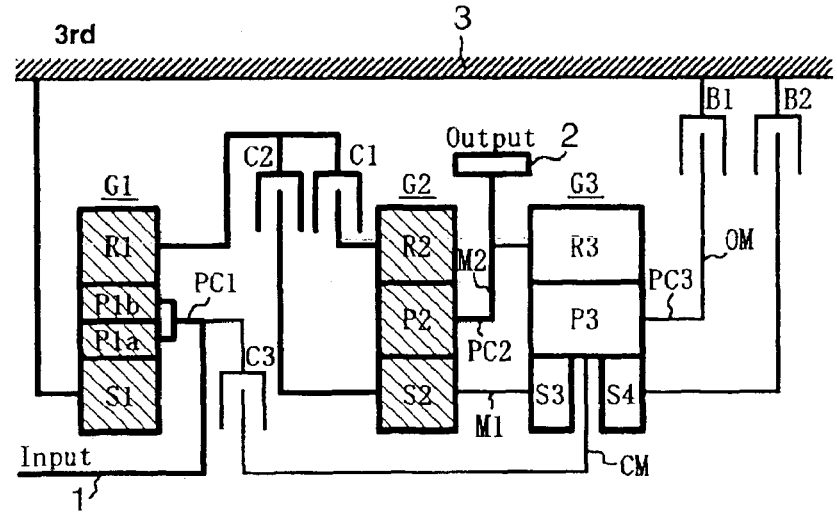

A torque-transfer path at third speed is as shown in FIG. 15C. Thus, torque acts on the first and second clutches C1, C2 and members shown by the bold line and the first and second planetary-gear sets G1, G2 shown by the hatching. The third planetary-gear set G3 is not involved in torque transfer.

Fourth speed: As shown in FIG. 2, fourth speed is obtained by releasing the second clutch C2 as engaged at third speed and engaging the third clutch C3, i.e. by engagement of the first and third clutches C1, C3. At fourth speed, in the second planetary-gear set G2, engagement of the first clutch C1 causes input of reduced rotation of the first planetary-gear set G1 to the second ring gear R2. On the other hand, in the third planetary-gear set G3, engagement of the third clutch C3 causes input of input rotation of the input shaft 1 to the third carrier PC3 through the center member CM. This increases rotation of the third sun gear S3 with respect to that of the third ring gear R3, which is transferred to the second sun gear S2 through the first coupling member M1.

Thus, the second planetary-gear set G2 receives reduced rotation through the second ring gear R2 and increased rotation through the second sun gear S2. Rotation obtained by increasing reduced rotation of the second ring gear R2 is provided to the output gear 2 through the second carrier PC2 and the second coupling member M2. Note that this increased rotation is lower than input rotation. That is, as shown in FIG. 14, fourth speed is defined by the line connecting the engagement point of the first clutch C1 where reduced rotation of the first pianetary-gear set G1 is input to the second ring gear R2 and an engagement point of the third clutch C3 where rotation of the third carrier PC3 is input to the first carrier PC1. And input rotation of the input shaft 1 is slightly reduced and provided through the output gear 2.

Figure 16A:
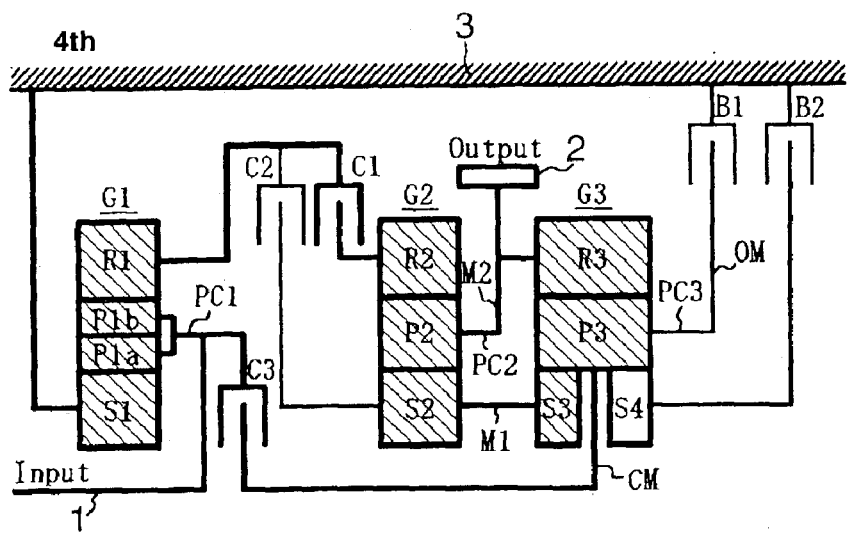
FIGS. 16A–16C are diagrams similar to FIG. 15C, showing torque-transfer paths in the gear change-speed unit in FIG. 13 at fourth, fifth, and sixth forward speeds, respectively.
Figure 17:
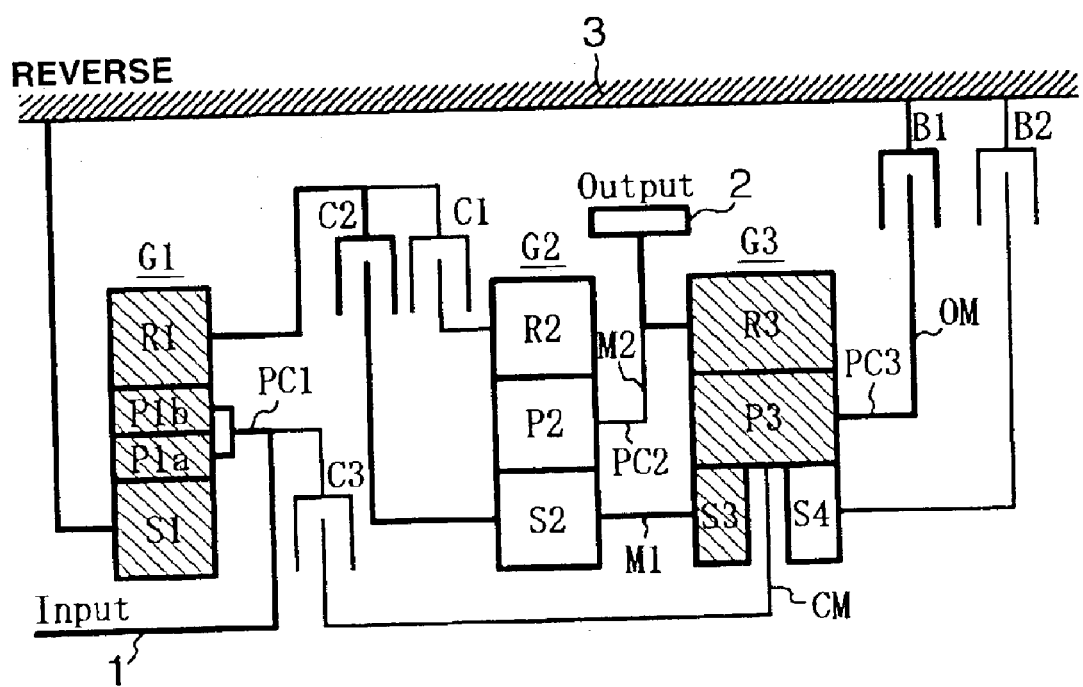
FIG. 17 is a diagram similar to FIG. 16C, showing a torque-transfer path in the gear change-speed unit in FIG. 13 at reverse speed.

A torque-transfer path at fourth speed is as shown in FIG. 16A. Thus, torque acts on the first and third clutches C1, C3 and members shown by the bold line and the first, second, and third planetary-gear sets G1, G2, G3 (except the fourth sun gear S4) shown by the hatching.

Fifth speed: As shown in FIG. 2, fifth speed is obtained by releasing the first clutch C1 as engaged at fourth speed and engaging the second clutch C2, i.e. by engagement of the second and third clutches C2, C3. At fifth speed, engagement of the second clutch C2 causes input of reduced rotation of the first planetary-gear set G1 to the third sun gear S3 through the second sun gear S2 and the first coupling member M1. Simultaneously, engagement of the third clutch C3 causes input of input rotation of the input shaft 1 to the third carrier PC3 through the center member CM.

Thus, the third planetary-gear set G3 receives input rotation through the third carrier PC3 and reduced rotation through the third sun gear S3. Increased rotation with respect to input rotation is provided to the output gear 2 through the third ring gear R3 and the second coupling member M2. That is, as shown in FIG. 14, fifth speed is defined by the line connecting the engagement point of the second cutch C2 where reduced rotation of first planetary-gear set G1 is input to the third sun gear S3 and the engagement point of the third clutch C3 where rotation of the third carrier PC3 is input to the first carrier PC1. And input rotation of the input shaft 1 is slightly increased and provided through the output gear 2.

Figure 16B:
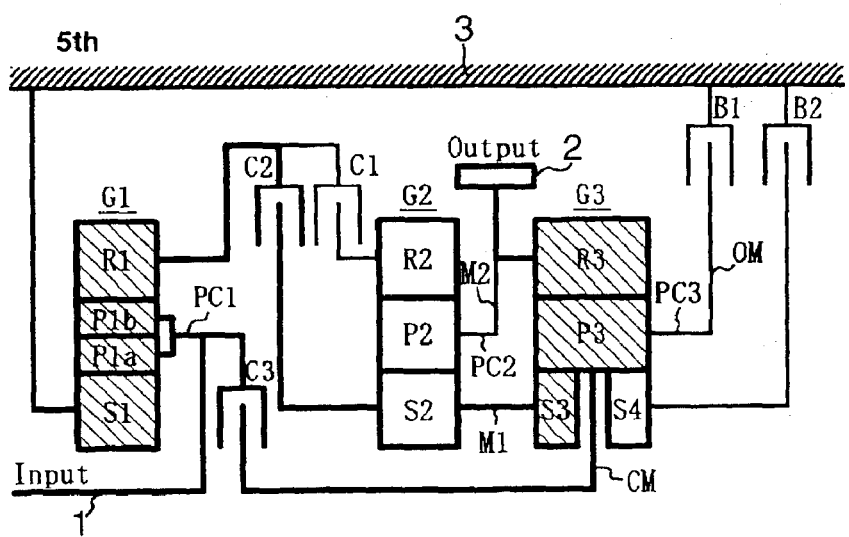

A torque-transfer path at fifth speed is as shown in FIG. 16B. Thus, torque acts on the second and third clutches C2, C3 and members shown by the bold line and the first and third planetary-gear sets G1, G3 (except the fourth sun gear S4) shown by the hatching.

Sixth speed: As shown in FIG. 2, sixth speed is obtained by releasing the second clutch C2 as engaged at fifth speed and engaging the second brake B2, i.e. by engagement of the third clutch C3 and the second brake B2. At sixth speed, engagement of the third clutch C3 causes input of input rotation of the input shaft 1 to the third carrier PC3 through the center member CM. Moreover, engagement of the second brake B2 causes fixing of the fourth sun gear S4 of the third planetary-gear set G3 to the transmission casing 3.

Thus, the third planetary-gear set G3 receives input rotation through the third carrier PC3, and has the fourth sun gear S4 fixed to the transmission casing 3. Increased rotation with respect to input rotation is provided to the output gear 2 through the third ring gear R3 and the second coupling member M2. That is, as shown in FIG. 14, sixth speed is defined by the line connecting the engagement point of the third clutch C3 where rotation of the third carrier PC3 is input to the first carrier PC1 and the engagement point of the second brake B2 where the fourth sun gear S4 is fixed to the transmission casing 3. And input rotation of the input shaft 1 is increased and provided through the output gear 2.

Figure 16C:
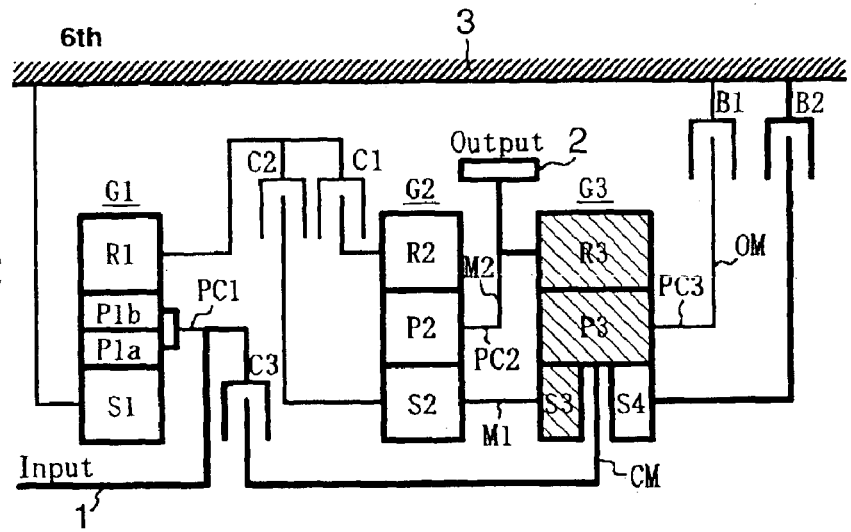

A torque-transfer path at sixth speed is as shown in FIG. 16C. Thus, torque acts on the third clutch C3, second brake B2, and members shown by the bold line and the third planetary-gear set G3 (except the third sun gear S3) shown by the hatching.

Reverse: As shown in FIG. 2, reverse speed is obtained by engaging the second clutch C2 and the first brake B1. At reverse speed, engagement of the second clutch C2 causes input of reduced rotation of the first planetary-gear set G1 to the third sun gear S3 through the second sun gear S2 and the first coupling member M1. Moreover, engagement of the first brake B1 causes fixing of the third carrier PC3 to the transmission casing 3.

Thus, the third planetary-gear set G3 receives normal-direction reduced rotation through the third sun gear S3, and has the third carrier PC3 fixed to the transmission casing 3. Reverse-direction reduced rotation of the third ring gear R3 is provided to the output gear 2 through the second coupling member M2. That is, as shown in FIG. 14, reverse speed is defined by the line connecting the engagement point of the second cutch C2 where reduced rotation of the first planetary-gear set G1 is input to the third sun gear S3 and the engagement point of the first brake B1 where rotation of the third carrier PC3 is stopped. And input rotation of the input shaft 1 is reduced in the reverses direction and provided through the output gear 2.

A torque-transfer path at reverse speed is as shown in FIG. 17. Thus, torque acts on the second clutch C2, first brake B1, and members shown by the bold line and the first and third planetary-gear sets G1, G3 (except the fourth sun gear S4) shown by the hatching.

In addition to the effects as described in connection with the first embodiment, the second embodiment produces the following effects. That is, at first and second speed, ring-gear input can be achieved to the Ishimaru-type planetary-gear train comprising second and third planetary-gear sets G2, G3, resulting in further downsizing of the transmission. Moreover, due to no torque circulation at second speed, the transfer efficiency is enhanced at second speed, resulting in enhancement in fuel consumption.

Figure 18:
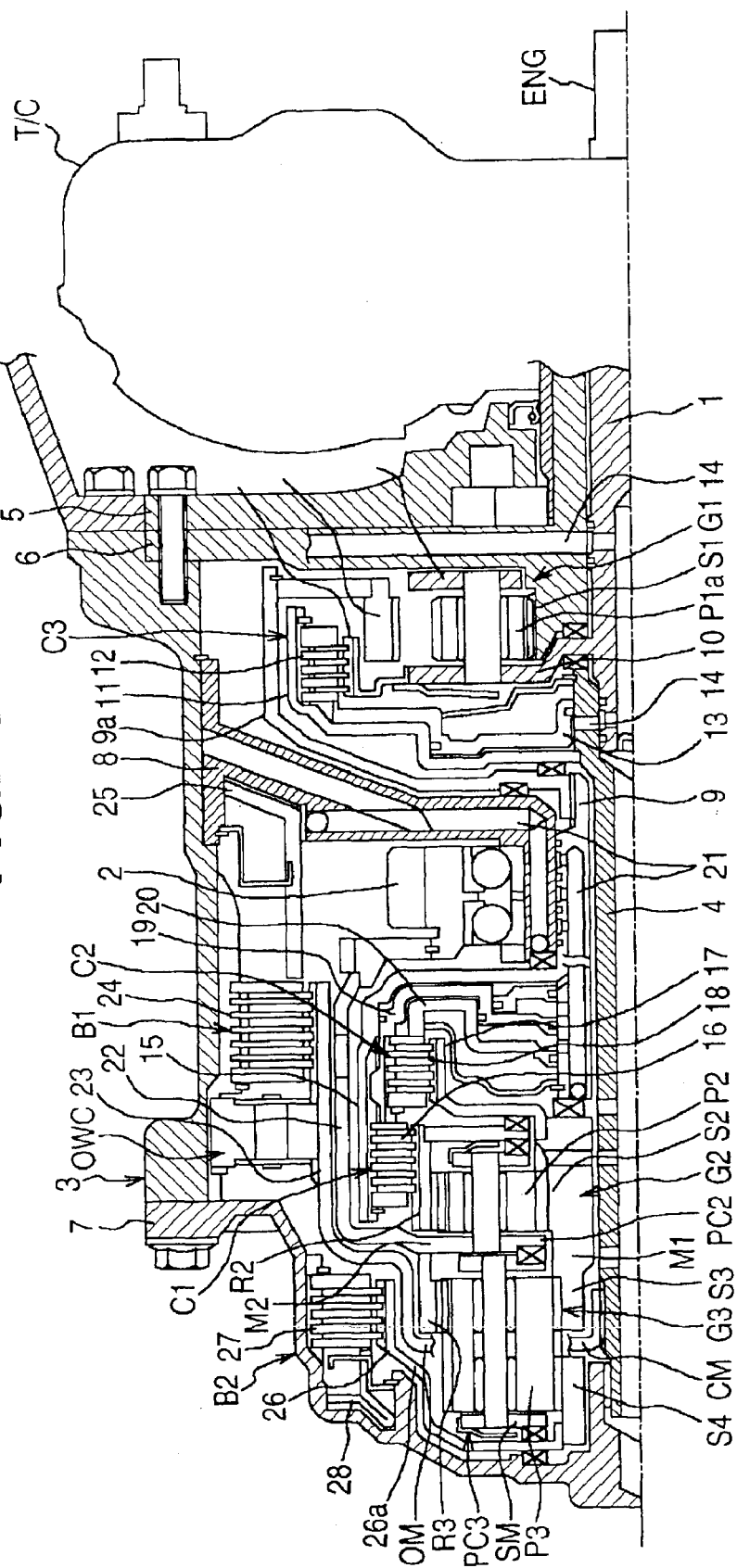
FIG. 18 is a view similar to FIG. 12, showing the gear change-speed unit in FIG. 13.

Referring to FIG. 18, the structure of the second embodiment is described in detail. Note that the input and output parts 1, 2 in FIG. 12 are reversed left to right with respect to those in FIGS. 13 and 15A–176. The input shaft 1 and an intermediate shaft 4 are arranged in the transmission casing 3 in the butt state allowing coaxial relative rotation, each shaft being supported rotatable separately with respect to the transmission casing 3. A front-end opening of the transmission casing 3 close to the input shaft 1 is concealed by a pump casing comprising a housing 5 and a cover 6. The input shaft 1, which is arranged through the pump casing for supporting, has a protruding end drivingly coupled to an engine ENG or power source through a torque converter T/C.

A rear end of the intermediate shaft 4 distant from the input shaft 1 is rotatably supported by an end cover 7 at a rear end of the transmission casing 3. An intermediate wall 8 is arranged in a roughly axially middle position of the transmission casing 3 to rotatably support the output gear 2. The intermediate wall 8 is formed with a center hole to rotatably support a front end of the intermediate shaft 4 through a hollow shaft 9.

The first planetary-gear set G1 is disposed in a front space defined between the pump casing and the intermediate wall 8. The third clutch C3 is disposed to enclose the first planetary-gear set G1. The first planetary-gear set G1 has sun gear S1 fixedly mounted to the pump cover 6 so as to disable rotation at all times, and carrier PC1 couple to a flange 10 extending radially outward from the input shaft 1. A clutch drum 11 is arranged to extend radially outward from a front end of the intermediate shaft 4 close to the input shaft 1 so as to enclose the ring gear R1 and the clutch hub 32. A clutch pack 12 is arranged between the clutch drum 11 and the clutch hub 32, and comprises a layered structure of clutch plates splined to the inner periphery of the clutch drum 11 and the outer periphery of the clutch hub 32. The clutch drum 11 and the clutch pack 12 constitute third clutch C3. A piston 13 of the third clutch C3 is fitted in an end wall of the clutch drum 11 facing the first planetary-gear set G1, and makes stroke under the working oil pressure out of a hydraulic passage 14 formed through the pump cover 6, the input shaft 1, and the intermediate shaft 4 so as to allow engagement of the third clutch C3. A drum-shaped coupling member 9a is arranged to extend radially outward from a front end of the hollow shaft 9 so as to then enclose the third clutch C3, and has a front end coupled to the first ring gear R1.

The second and third planetary-gear sets G2, G3, the first and second clutches C1, C2, and the first and second brakes B1, B2 are disposed in a rear space defined between the intermediate wall 8 and the end cover 7. Specifically, the second and third planetary-gear sets G2, G3 are disposed on the intermediate shaft 4, wherein the second planetary-gear set G2 is closer to the input shaft 1 than the third planetary-gear set G3. The sun gears S2, S3 of the second and third planetary-gear sets G2, G3 are integrated through the first coupling member M1, and are rotatably supported on the intermediate shaft 4. A clutch drum 15 is arranged to extend radially outward from a roughly middle portion of the hollow shaft 9 and then axially backward to the outer periphery of the second ring gear R2. A clutch pack 16 is arranged between the clutch drum 15 and the ring gear R2, and comprises a layered structure of clutch plates splined to the inner periphery of the clutch drum 15 and the outer periphery of the ring gear R2 The clutch drum 15 and the clutch pack 16 constitute first clutch C1.

In order to dispose the second clutch C2 closer to the input shaft 1 than the first clutch C1 located at the outer periphery of the second planetary-gear set G2 as described above, a clutch hub 17 is fixedly mounted to the second sun gear S2 at an outer edge close to the input shaft 1 to extend radially outward. A clutch pack 18 is arranged between the clutch hub 17 and the clutch drum 15, and comprises a layered structure of clutch plates splined to the outer periphery of the clutch hub 17 and the inner periphery of the clutch drum 15. The clutch hub 17 and the clutch pack 18 constitute second clutch C2. Pistons 19, 20 of the first and second clutches C1, C2, which include a double piston wherein the clutch piston 20 slides inside the clutch piston 19, are disposed on the side of the second clutch C2 distant from the first clutch C1, so that the clutch piston 20 is fitted in an end wall of the clutch drum 15 facing the second planetary-gear set G2. The clutch pistons 19, 20 make stroke under the working oil pressure out of respective hydraulic passages 21 (one of which being shown in FIG. 18) formed through the intermediate wall 8 and the hollow shaft 9 so as to allow individual engagement of the first and second clutches C1, C2.

The third planetary-gear set G3 comprises a double-sun-gear type planetary-gear set as described above, wherein the ring gear R3 is smaller in teeth width than the pinion P3 to locate the ring gear R3 meshed with the pinion P3 at an end close to the second planetary-gear set G2, thus allowing shortening of the second coupling member M2 for coupling the ring gear R3 to the carrier PC2 of the second planetary-gear set G2. A cylindrical coupling member 22, which is disposed to enclose the clutch drum 15 of the first and second clutches C1, C2, has one end connected to the outer periphery of the second coupling member M2 and another end connected to the output gear 2.

As is described in the first embodiment, provided to the carrier PC3 of the third planetary-gear set G3 are center member CM extending radially inward from a side member SM for supporting the pinion P3 through a space between the sun gears S3, S4, and outer member OM extending radially outward from the carrier PC3 in the roughly axially middle position of the pinion P3. The center member CM is drivingly coupled to the intermediate shaft 4, thereby coupling the carrier PC3 to the clutch drum 11 of the third clutch C3 through the center member CM and the intermediate shaft 4. A brake hub 23, which is coupled to the outer periphery of the outer member OM, is disposed at the outer periphery of the coupling member 22 to extend forward so as to approach the intermediate wall 8. A brake pack 24 is arranged between the brake hub 23 and the transmission casing 3, and comprises a layered structure of brake plates splined to the outer periphery of a front end of the brake hub 23 and the inner periphery of the transmission casing 3, thereby constituting the first brake B1. The first bake B1 can be engaged as required by a brake piston 25 fitted in the intermediate wall 8 in front of the brake pack 24.

A brake hub 26 is arranged to conceal a rear end of the brake hub 23, and has a rear-end wall 26a to extend circumferentially inward along the back of the third planetary-gear set G3. The inner periphery of the rear-end wall 26a is coupled to the sun gear S4 of the third planetary-gear set G3. A brake pack 27 is arranged between the brake hub 26 and the transmission casing 3, and comprises a layered structure of brake plates splined to the outer periphery of the brake hub 26 and the inner periphery of the transmission casing 3, thereby constituting the second brake B2. The second bake B2 can be engaged as required by a brake piston 28 fitted in the transmission casing 3 at a rear position of the brake pack 27. Thus, the first brake B1 is disposed at the outer periphery of the first and second clutches C1, C2, whereas the second brake B2 is disposed at the outer periphery of the third planetary-gear set G3, wherein the first brake B1 is closer to the input shaft 1 or the first planetary-gear set G1 than the second brake B2.

As is not shown in FIGS. 13 and 15A–17, a one-way clutch OWC is arranged between an axially middle portion of the brake hub 23 constituting the first brake B1 and the transmission casing 3, wherein first forward speed is achieved with the first brake B1 released and with one-direction rotation of the third carrier PC3 blocked by the one-way clutch OWC. At first speed achieved by the one-way clutch OWC, the clutch OWC allows reverse rotation of the third carrier PC3 during engine brake to obtain no engine brake, so that upon request of engine brake, the first brake B1 is engaged to block reverse rotation of the third carrier PC3. A countershaft similar to the countershaft 29 having a counter gear 30 and a final drive pinion 31 integrated therewith as shown in FIG. 12 is rotatably arranged in the transmission casing 3, through which output rotation of the gear change-speed unit is provided to a differential-gear device arranged between the automotive driving wheels.

In the same way as the first embodiment, the second embodiment produces the following effects, since the three planetary-gear sets, i.e. reduction planetary-gear set G1, single-pinion type planetary-gear set G2, and double-sun-gear type planetary-gear set G3, are arranged in parallel in this order from the side of the input shaft 1. That is, due to higher flexibility of layout of the ring gear R3 about the axial position at the outer periphery of the third planetary-gear set G3 located at the rear end the most distant from the input shaft 1, the ring gear R3 can be positioned closer to the input shaft 1 as shown in FIG. 18 to mesh with the pinion P3. And the member for coupling the carrier PC3 of the third planetary-gear set G3 to the first brake B1 (brake hub 23) for fixing the carrier PC3 includes outer member OM which extends radially outward from the carrier PC3 in the roughly axially middle position of the pinion P3 along the end face of the ring gear R3 displaced forward or in the direction of the second planetary-gear set G2 and meshed with the pinion P3. Therefore, the transmission casing 3 (end cover 7) in the vicinity of the outer periphery of the rear end of the third planetary-gear set G3 can radially be narrowed as shown in FIG. 18 without interference from the ring gear R3 and the outer member OM. As a result, when achieving horizontal disposition in an automotive engine room, the gear change-speed unit can be reduced in the outer periphery of the end portion (end cover 7) distant from the input shaft 1 so as not to interfere with vehicle-body members protruding in the engine room, providing enhanced vehicle mountability in addition to the advantages as described with reference to FIGS. 1 and 4A–6. Moreover, due to a large space which the above arrangement of the ring gear R3 and the outer member OM provides in the vicinity of the outer periphery of the rear end of the third planetary-gear set G3, the end wall 26a of the brake hub 26 connecting the fourth sun gear S4 and the second brake B2 for fixing thereof can be bent in such a way as to enter the space, resulting in sure radial narrowing of the transmission casing 3 (end cover 7) in the vicinity of the outer periphery of the rear end of the third planetary-gear set G3 as shown in FIG. 18. This effect comes to the fore by bending the outer member OM in such a way as to conceal the outer periphery of the ring gear R3 as shown in FIG. 18 and then extend along the second coupling member M2. Thus, even with the second brake B2 disposed at the outer periphery of the third planetary-gear set G3, the transmission casing 3 (end cover 7) can radially be narrowed in the vicinity of the outer periphery of the rear end of the third planetary-gear set G3 as shown in FIG. 18.

Further, the two of the three clutches C1, C2, C3, i.e. first and second clutches C1, C2 for distributing output rotation of the first planetary-gear set G1 to the change-speed planetary-gear set comprising second and third planetary-gear sets G2, G3, are disposed closer to the second planetary-gear set G2 than the third planetary-gear set G3. Therefore, the clutches C1, C2 are disposed closer to the input shaft 1, allowing enlargement of a possible area of radially narrowing the transmission casing 3 (end cover 7) in the vicinity of the outer periphery of the rear end of the third planetary-gear set G3 regardless of presence of the first and second clutches C1, C2, resulting in further enhanced vehicle mountability of the gear change-speed unit when horizontally disposed in the engine room. Still further, the above disposition of the first and second clutches C1, C2 allows the clutches C1, C2 to approach the first planetary-gear set G1, reducing the length of the members (hollow shaft 9 and clutch drum 15) for coupling the clutches C1, C2 to the first planetary-gear set G1, resulting in achievement of a reduction in length, size, and weight and a simplification of the coupling members. Furthermore, parallel arrangement of the first and second clutches C1, C2 allows double-piston structure of the clutch pistons 19, 20 as described above, leading not only to axial downsizing thereof, but also to reduction in number of parts due to common use of return springs and centrifugal-pressure cancel chambers of the pistons 19, 20 and thus to downsizing and cost reduction of the transmission.

Still further, in addition to the above disposition of the first and second clutches C1, C2, the pistons 19, 20 of the clutches C1, C2 are disposed on the side of the second planetary-gear set G2 distant from the third planetary-gear set G3. Therefore, the pistons 19, 20 are absent at the outer periphery of the third planetary-gear set G3, allowing radial narrowing of the transmission casing 3 (end cover 7) in the vicinity of the outer periphery of the rear end of the third planetary-gear set G3, resulting in further enhanced vehicle mountability of the gear change-speed unit when horizontally disposed in the engine room.

Furthermore, the third clutch C3 for directly providing rotation of the input shaft 1 to the change-speed planetary-gear set (carrier PC3 of the third planetary-gear set G3 in FIG. 18) comprising second and third planetary-gear sets G2, G3 is disposed at the outer periphery of the first planetary-gear set G1. Therefore, the third clutch C3 is located closer to the input shaft 1 than the first and second clutches C1, C2, allowing radial narrowing of the transmission casing 3 (end cover 7) in the vicinity of the outer periphery of the rear end of the third planetary-gear set G3, resulting in further enhanced vehicle mountability of the gear change-speed unit when horizontally disposed in the engine room. Moreover, this contributes not only to easy arrangement of the hydraulic passages 21, 14 for the clutches C1, C2, C3 and reduction in length difference therebetween, but also to improved controllability of the clutches and uniform response for shift in which the clutches are involved.

Further, the piston 13 of the third clutch C3 is disposed on the side of the first planetary-gear set G1 close to the second planetary-gear set G2. Therefore, the piston 13 of the third clutch C3 is disposed opposite and adjacent to the pistons 19, 20 of the first and second clutches C1, C2, resulting in sure achievement of the above effect of contributing not only to easy arrangement of the hydraulic passages 21, 14 for the clutches C1, C2, C3 and reduction in length difference therebetween, but also to improved controllability of the clutches and uniform response for shift in which the clutches are involved.

Still further, the hydraulic passage 21 for the first and second clutches C1, C2 are formed through the intermediate wall or output-gear support wall 8 provided to the transmission casing 3 between the first and second planetary-gear sets G1, G2. This not only can reduce the length of the hydraulic passage 21 to be arranged between the control-valve body mounted to the transmission casing 3 in any given circumferential position and the first and second clutches C1, C2, but also can roughly equalize the lengths of the hydraulic passages 14, 21, resulting in uniform response for shift in which the clutches are involved.

Furthermore, the first brake B1 for fixing the carrier PC3 of the third planetary-gear set G3 is disposed closer to the first planetary-gear set G1 than the second brake B2 for fixing the sun gear S4 of the third planetary-gear set G3 distant from the second planetary-gear set G2. Therefore, when extending to the third planetary-gear set G3 distant from the input shaft 1 the coupling member OM for coupling the carrier PC3 of the third planetary-gear set G3 to be coupled by the first brake B1 to the first brake B1, and the coupling member 26a for coupling the sun gear S4 of the third planetary-gear set G3 distant from the second planetary-gear set G2 and to be fixed by the second brake B2 to the second brake B2, arrangement of the coupling members OM, 26a is carried out easily in association with the positions of the carrier PC3 and the sun gear S4, and a reduction in length of the coupling members OM, 26a contributes greatly to enhancement in manufacturing cost, rigidity, and space efficiency.

Further, the hydraulic passage 21 for the first and second clutches C1, C2 is formed through the intermediate wall 8 for supporting the output gear 2, whereas the hydraulic passage 14 for the third clutch C3 is formed through the pump cover 6. Therefore, all the hydraulic passages are concentratedly arranged at the front of the transmission casing 3 which is advantageous for passing of the hydraulic pressure out of the control-valve body, allowing simplification of the shift control circuit.

Having described the present invention in connection with the illustrative embodiment, it is noted that the present invention is not limited thereto, and various changes and modifications can be made without departing from the scope of the present invention.

The entire teachings of Japanese Patent Application P2002-207242 filed Jul. 16, 2002 are incorporated hereby by reference.

What is claimed is:

1. A gear change-speed unit for an automatic transmission, comprising:
   an input part which receives rotation of a power source;
   an output part arranged coaxially with the input part;
   planetary-gear sets which provide transfer paths between the input and output parts; and
   clutches and brakes arranged to be engaged and released selectively, the clutches and brakes selecting one of the transfer paths of the planetary-gear sets to change rotation of the input part at a corresponding gear ratio and provide it to the output part, the clutches and brakes allowing at least 6 forward speeds and 1 reverse speed by a combination of engagement and release of the clutches and brakes,
   the first planetary-gear set comprising a reduction planetary-gear set reducing input rotation at all times,
   the second planetary-gear set comprising a second sun gear, a second pinion meshed with the second sun gear, a second ring gear meshed with the second pinion, and a second carrier supporting the second pinion,
   the third planetary-gear set comprising third and fourth sun gears, a third pinion meshed with the third and fourth sun gears, a third ring gear meshed with the third pinion, and a third carrier receiving and providing rotation between the third and fourth sun gears through a center member coupled to a side member which rotatably supports the third pinion, the third sun gear being close to the input part, the fourth sun gear being distant from the input part,
   the second and third planetary-gear sets constituting a change-speed planetary-gear set, and
   the first, second, and third planetary-gear sets being disposed in parallel in this order from the side of the input part.

2. The gear change-speed unit as claimed in claim 1, wherein the first and second clutches distributing output rotation of the first planetary-gear set to the change-speed planetary-gear set are arranged closer to the second planetary-gear set than the third planetary-gear set.

3. The gear change-speed unit as claimed in claim 2, wherein the first and second clutches comprise respective pistons arranged on the side of the second planetary-gear set distant from the third planetary-gear set.

4. The gear change-speed unit as claimed in claim 1, wherein the third clutch directly providing rotation of the input part to the change-speed planetary-gear set is arranged at the outer periphery of the first planetary-gear set.

5. The gear change-speed unit as claimed in claim 4, wherein the third clutch comprises a piston arranged on the side of the first planetary-gear set close to the second planetary-gear set.

6. The gear change-speed unit as claimed in claim 1, wherein the output part is disposed between the first and second planetary-gear sets.

7. The gear change-speed unit as claimed in claim 1, further comprising a transmission casing provided with a wall, the transmission casing supporting the output part rotatably through the wall.

8. The gear change-speed unit as claimed in claim 7, further comprising hydraulic passages formed through the wall, the hydraulic passages communicating with the first and second clutches.

9. The gear change-speed unit as claimed in claim 1, wherein the first and second brakes are arranged closer to the second planetary-gear set than the third planetary-gear set, the first and second brakes fixing rotary members of the change-speed planetary-gear set.

10. The gear change-speed unit as claimed in claim 1, wherein the first and second brakes are arranged at the outer periphery of the first and second clutches.

11. The gear change-speed unit as claimed in claim 1, wherein the first brake fixes the third carrier of the third planetary-gear set, and the second brake fixes the fourth sun gear of the third planetary-gear set distant from the second planetary-gear set, wherein the first brake is disposed closer to the first planetary-gear set than the second brake.

12. The gear change-speed unit as claimed in claim 1, wherein the input part is coupled to the first ring gear, and the output part is coupled to an integrated unit of the second carrier and the third ring gear,
   wherein the first clutch engages and releases the first carrier from the second ring gear, the second clutch engages and releases the first carrier from the integrated unit, the third clutch engages and releases the third carrier from the input part, the first brake fixes the third carrier, the second brake fixes the fourth sun gear, and
   wherein a first speed is obtained by engaging the first clutch and the first brake, a second speed by engaging the first clutch and the second brake, a third speed by engaging the first and second clutches, a fourth speed by engaging the first and third clutches, a fifth speed by engaging the second and third clutches, a sixth speed by engaging the third clutch and the second brake, and a reverse speed by engaging the second clutch and the first brake.

13. The gear change-speed unit as claimed in claim 1, wherein the input part is coupled to the first carrier, and the output part is coupled to an integrated unit of the second carrier and the third ring gear,
   wherein the first clutch engages and releases the first carrier from the second ring gear, the second clutch engages and releases the first ring gear from the integrated unit, the third clutch engages and releases the third carrier from the input part, the first brake fixes the third carrier, the second brake fixes the fourth sun gear, and
   wherein a first speed is obtained by engaging the first clutch and the first brake, a second speed by engaging the first clutch and the second brake, a third speed by engaging the first and second clutches, a fourth speed by engaging the first and third clutches, a fifth speed by engaging the second and third clutches, a sixth speed by engaging the third clutch and the second brake, and a reverse speed by engaging the second clutch and the first brake.

14. The gear change-speed unit as claimed in claim 12, further comprising:
   a coupling member which couples the output part to an integrated unit of the second carrier and the third ring gear, wherein the output part is disposed between the first and second planetary-gear sets, the first and second clutches are arranged at the inner periphery of the coupling member, and the first and second brakes are arranged at the outer periphery of the coupling member;
   an outer member coupled to the first brake, the outer member extending radially outward from the third carrier in a roughly axially middle position of the third pinion, wherein the first brake is disposed closer to the input part than the second brake;
   a radial member which couples the second brake to the fourth sun gear, the radial member extending radially outward from the fourth sun gear; and
   an intermediate shaft arranged through the second and third planetary-gear sets,
   wherein the third clutch is disposed at the outer periphery of the first planetary-gear set, the third clutch comprising a drum coupled to the third carrier through the intermediate shaft and the center member.

15. The gear change-speed unit as claimed in claim 13, further comprising:
   a coupling member which couples the output part to an integrated unit of the second carrier and the third ring gear, wherein the output part is disposed between the first and second planetary-gear sets, the first and second clutches are arranged at the inner periphery of the coupling member, and the first and second brakes are arranged at the outer periphery of the coupling member;
   an outer member coupled to the first brake, the outer member extending radially outward from the third carrier in a roughly axially middle position of the third pinion, wherein the first brake is disposed closer to the input part than the second brake;
   a radial member which couples the second brake to the fourth sun gear, the radial member extending radially outward from the fourth sun gear; and
   an intermediate shaft arranged through the second and third planetary-gear sets,
   wherein the third clutch is disposed at the outer periphery of the first planetary-gear set, the third clutch comprising a drum coupled to the third carrier through the intermediate shaft and the center member.

16. The gear change-speed unit as claimed in claim 1, wherein the first planetary-gear set comprises a single-pinion type planetary-gear set.

17. The gear change-speed unit as claimed in claim 1, wherein the first planetary-gear set comprises a double-pinion type planetary-gear set.

18. An automatic transmission with an input part for receiving rotation of a power source and an output part arranged coaxially with the input part, comprising:
   planetary-gear sets which provide transfer paths between the input and output parts; and
   clutches and brakes arranged to be engaged and released selectively, the clutches and brakes selecting one of the transfer paths of the planetary-gear sets to change rotation of the input part at a corresponding gear ratio and provide it to the output part, the clutches and brakes allowing at least 6 forward speeds and 1 reverse speed by a combination of engagement and release of the clutches and brakes,
   the first planetary-gear set comprising a reduction planetary-gear set reducing input rotation at all times,
   the second planetary-gear set comprising a second sun gear, a second pinion meshed with the second sun gear, a second ring gear meshed with the second pinion, and a second carrier supporting the second pinion,
   the third planetary-gear set comprising third and fourth sun gears, a third pinion meshed with the third and fourth sun gears, a third ring gear meshed with the third pinion, and a third carrier receiving and providing rotation between the third and fourth sun gears through a center member coupled to a side member which rotatably supports the third pinion, the third sun gear being close to the input part, the fourth sun gear being distant from the input part,
   the second and third planetary-gear sets constituting a change-speed planetary-gear set, and the first, second, and third planetaiy-gear sets being disposed in parallel in this order from the side of the input part.

19. The gear change-speed unit as claim in claim 1, wherein the first planetary-gear set comprises a first sun gear, a first pinion gear meshed with the first sun gear, a first ring gear meshed with the first pinion, and a first carrier supporting the first pinion.

20. The gear change-speed unit as claimed in claim 18, wherein the first planetary-gear set comprises a first sun gear, a first pinion gear meshed with the first sun gear, a first ring gear meshed with the first pinion, and a first carrier supporting the first pinion.

* * * * *